United States Patent
Steidl et al.

(10) Patent No.: US 7,933,354 B2
(45) Date of Patent: Apr. 26, 2011

(54) ENCODING AND DECODING ARCHITECTURE AND METHOD FOR PIPELINING ENCODED DATA OR PIPELINING WITH A LOOK-AHEAD STRATEGY

(75) Inventors: Samuel A. Steidl, Torrance, CA (US); Peter F. Curran, Torrance, CA (US)

(73) Assignee: Semtech Corporation, Camarillo, CA (US)

( * ) Notice: Subject to any disclaimer, the term of this patent is extended or adjusted under 35 U.S.C. 154(b) by 1108 days.

(21) Appl. No.: 11/641,363

(22) Filed: Dec. 18, 2006

(65) Prior Publication Data

US 2008/0118246 A1 May 22, 2008

Related U.S. Application Data

(60) Provisional application No. 60/860,534, filed on Nov. 22, 2006.

(51) Int. Cl.
*H04L 27/10* (2006.01)
(52) U.S. Cl. ........ 375/283; 375/279; 375/244; 375/330; 375/280; 375/281
(58) Field of Classification Search .................. 375/283, 375/279, 244, 330, 280, 281; 398/188; 455/23
See application file for complete search history.

(56) References Cited

U.S. PATENT DOCUMENTS

| | | | | |
|---|---|---|---|---|
| 4,949,249 | A * | 8/1990 | Lefsky et al. | 713/600 |
| 4,958,274 | A * | 9/1990 | Dutton et al. | 713/600 |
| 5,280,597 | A * | 1/1994 | Takata et al. | 711/169 |
| 5,339,442 | A * | 8/1994 | Lippincott | 710/244 |
| 5,369,378 | A | 11/1994 | Kosaka et al. | |
| 6,026,124 | A | 2/2000 | Lee et al. | |
| 6,075,827 | A | 6/2000 | Shida et al. | |
| 6,473,449 | B1 | 10/2002 | Cafarella et al. | |
| 7,106,804 | B2 | 9/2006 | Falkenberg | |

(Continued)

FOREIGN PATENT DOCUMENTS

EP 1 696 587 8/2006

(Continued)

OTHER PUBLICATIONS

Filtronic ST-105 Wideband Turner, Demodulator & Bitsync, Powerwave Base Station Systems, Powerwave Technologies 2006.

*Primary Examiner* — Shuwang Liu
*Assistant Examiner* — Helene Tayong
(74) *Attorney, Agent, or Firm* — McDermott Will & Emery LLP

(57) ABSTRACT

An encoding and/or decoding communication system comprises a framer interface, an encoder, a multiplexer, an output driver, and a clock multiplier unit (CMU). The encoder includes an input latch circuitry stage; an output latch circuitry stage; an intermediate latch circuitry stage interposed between the input latch circuitry stage and the output latch circuitry stage, the intermediate latch circuitry stage coupled to the input latch circuitry stage and the output latch circuitry stage; a plurality of encoding logic circuitry stages interposed between the input latch circuitry stage and the output latch circuitry stage, a last one of the plurality of encoding logic circuitry stages placed adjacent to the output latch circuitry stage and coupled to the output latch circuitry stage; and a feedback between the output latch circuitry stage and the last one of the plurality of encoding logic circuitry stages.

33 Claims, 6 Drawing Sheets

U.S. PATENT DOCUMENTS

| | | | |
|---|---|---|---|
| 7,356,076 B2* | 4/2008 | Xiao et al. | 375/219 |
| 7,428,692 B2* | 9/2008 | Konishi et al. | 714/772 |
| 2001/0040523 A1* | 11/2001 | Gendai | 341/159 |
| 2002/0097682 A1 | 7/2002 | Enam et al. | |
| 2004/0054703 A1 | 3/2004 | Huber et al. | |
| 2004/0123177 A1* | 6/2004 | Ooishi | 713/503 |
| 2004/0240377 A1 | 12/2004 | Palin et al. | |
| 2005/0074245 A1 | 4/2005 | Griffin | |
| 2005/0180682 A1 | 8/2005 | Griffin | |
| 2006/0193399 A1* | 8/2006 | Katagiri et al. | 375/308 |
| 2007/0053697 A1* | 3/2007 | Konishi et al. | 398/182 |
| 2009/0092395 A1* | 4/2009 | Vassilieva et al. | 398/79 |
| 2010/0135676 A1* | 6/2010 | Katagiri | 398/204 |

FOREIGN PATENT DOCUMENTS

| | | |
|---|---|---|
| GB | 2 383 705 | 3/2005 |

* cited by examiner

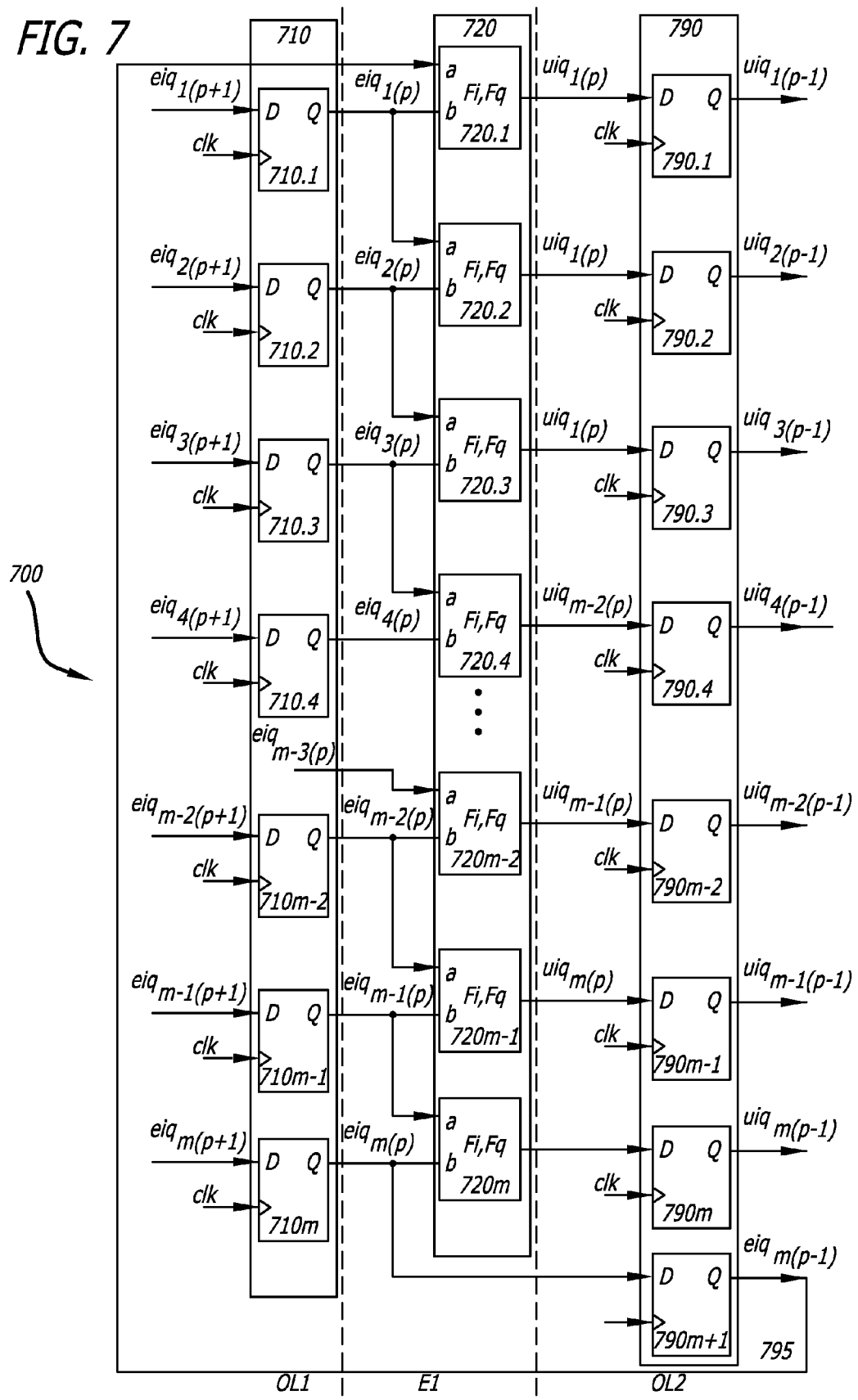

ENCODING AND DECODING ARCHITECTURE AND METHOD FOR PIPELINING ENCODED DATA OR PIPELINING WITH A LOOK-AHEAD STRATEGY

CROSS-REFERENCES TO RELATED APPLICATIONS

The present application claims the benefit of priority under 35 U.S.C. §119 from U.S. Provisional Patent Application Ser. No. 60/860,534, entitled "Encoding And Decoding Architecture and Method Using Pipelining or Pipelining with a Look-Ahead Strategy," filed on Nov. 22, 2006, which is hereby incorporated by reference in its entirety for all purposes.

FIELD OF THE INVENTION

The present invention generally relates to encoding and decoding, more particularly, relates to encoding and decoding architecture and method for pipelining encoded data or pipelining with a look-ahead strategy.

BACKGROUND OF THE INVENTION

Recently, the world has witnessed a phenomenal growth in the number of Internet users, applications and devices and in the amount of data traffic especially that of medium-rich content-all demanding reliable high data rate, low-cost, low power consumption communication devices. The Internet utilizes fiber optic channels for ultra high speed communications. The optical signals sent along the fiber optic channels are received by receivers that include both optical components and electrical components. The receivers convert the optical signals to electrical signals and send the converted electrical signals to electronic computer networks operating at lower speeds for processing data. The transmitters, on the other hand, receive the electrical signals from electronic computer networks, convert them into optical signals and send them to the fiber optic channels.

These receivers and transmitters used in telecommunications applications may need to meet the optical standards that have emerged. One such standard is the Synchronous Optical Networks (SONET) which is a standard formulated by the Exchange Carriers Standards Association (ECSA) for the American National Standards Institute (ANSI). The SONET is used for telecommunications and other industries mainly in North America and Japan. Another standard is the Synchronous Digital Hierarchy (SDH) standard which was published by the International Telecommunication Union (ITU) and used in other parts of the world. The OC-192 SONET standard or STM64 SDH Standard is for speeds at about 9-13 Gb/s depending on error correction coding, and the OC-768 SONET standard or STM 256 SDH Standard is for speeds at about 36 to 48 Gb/s.

An industry-wide initiative created the Optical Internetworking Forum (OIF), an open forum focused on fostering the development and deployment of interoperable products and services for data switching and routing using optical networking technologies. To accelerate the deployment of optical networking technology and facilitate industry convergence on interoperability, the OIF identified, selected, and augmented as appropriate and published optical internetworking standards. Information regarding the OIF and publications by the OIF can be found at www.oiforum.com.

SUMMARY OF THE INVENTION

According to one embodiment of the present invention, communication devices, and particularly serializers, deserializers, transmitters and receivers, can satisfy the high data rate, high-performance and/or low-power communication needs demanded by the Internet and other multimedia communication applications while meeting the SONET/SDH standards, the OIF standards and/or other communication standards.

According to one embodiment of the present invention, a differential quadrature phase shift key (DQPSK) encoding and/or decoding communication system for an optical communication system comprises: a framer interface configured to receive a plurality of data, an encoder coupled to the framer interface, a multiplexer coupled to the encoder; and a clock multiplier unit (CMU) coupled to the encoder and the multiplexer.

The encoder comprises: an input latch circuitry stage having a plurality of first inputs for receiving a plurality of first input signals and a plurality of first outputs for providing a plurality of first output signals, the plurality of first inputs including a plurality of in-phase and quadrature-phase inputs, the plurality of first outputs including a plurality of in-phase and quadrature-phase outputs; and an output latch circuitry stage having a plurality of second inputs for receiving a plurality of second input signals and a plurality of second outputs for providing a plurality of second output signals, the plurality of second inputs including a plurality of in-phase and quadrature-phase inputs, the plurality of second outputs including a plurality of in-phase and quadrature-phase outputs.

The encoder further comprises: an intermediate latch circuitry stage interposed between the input latch circuitry stage and the output latch circuitry stage, the intermediate latch circuitry stage coupled to the input latch circuitry stage and the output latch circuitry stage, the intermediate latch circuitry stage having a plurality of third inputs for receiving a plurality of third input signals and a plurality of third outputs for providing a plurality of third output signals, the plurality of third inputs including a plurality of in-phase and quadrature-phase inputs, the plurality of third outputs including a plurality of in-phase and quadrature-phase outputs.

The encoder further comprises: a plurality of encoding logic circuitry stages interposed between the input latch circuitry stage and the output latch circuitry stage, a last one of the plurality of encoding logic circuitry stages placed adjacent to the output latch circuitry stage and coupled to the output latch circuitry stage, the last one of the plurality of encoding logic circuitry stages having a plurality of fourth inputs and a plurality of fourth outputs, the plurality of fourth inputs including a plurality of in-phase and quadrature-phase inputs, the plurality of fourth outputs including a plurality of in-phase and quadrature-phase outputs; and a feedback between the output latch circuitry stage and the last one of the plurality of encoding logic circuitry stages.

According to one embodiment of the present invention, an encoding and/or decoding communication system comprises an encoder. The encoder includes: an input latch circuitry stage having a plurality of first inputs for receiving a plurality of first input signals and a plurality of first outputs for providing a plurality of first output signals; and an output latch circuitry stage having a plurality of second inputs for receiving a plurality of second input signals and a plurality of second outputs for providing a plurality of second output signals.

The encoder further includes: an intermediate latch circuitry stage interposed between the input latch circuitry stage and the output latch circuitry stage, the intermediate latch circuitry stage coupled to the input latch circuitry stage and the output latch circuitry stage, the intermediate latch circuitry stage having a plurality of third inputs for receiving a plurality of third input signals and a plurality of third outputs for providing a plurality of third output signals; a plurality of encoding logic circuitry stages interposed between the input latch circuitry stage and the output latch circuitry stage, a last one of the plurality of encoding logic circuitry stages placed adjacent to the output latch circuitry stage and coupled to the output latch circuitry stage, the last one of the plurality of encoding logic circuitry stages having a plurality of fourth inputs and a plurality of fourth outputs; and a feedback between the output latch circuitry stage and the last one of the plurality of encoding logic circuitry stages.

According to one aspect of the present invention, a method for encoding and/or decoding communication signals comprises the steps of: latching a plurality of first input signals at an input latch circuitry stage; receiving a plurality of second input signals at a first encoding logic circuitry stage coupled to the input latch circuitry stage; encoding the plurality of second input signals at the first encoding logic circuitry stage; latching a plurality of third input signals at an intermediate latch circuitry stage coupled to the first encoding logic circuitry stage; receiving a plurality of fourth input signals at a second encoding logic circuitry stage coupled to the intermediate latch circuitry stage; encoding the plurality of fourth input signals at the second encoding logic circuitry stage; latching a plurality of fifth input signals at an output latch circuitry stage coupled to the second encoding logic circuitry stage; providing a plurality of output signals at the output latch circuitry stage; and feeding back a last one of the plurality of output signals to the second encoding logic circuitry stage.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

FIG. 7 is a block diagram of a decoder for m pairs of i-q bit streams in accordance with one embodiment of the present invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

Figure 1:
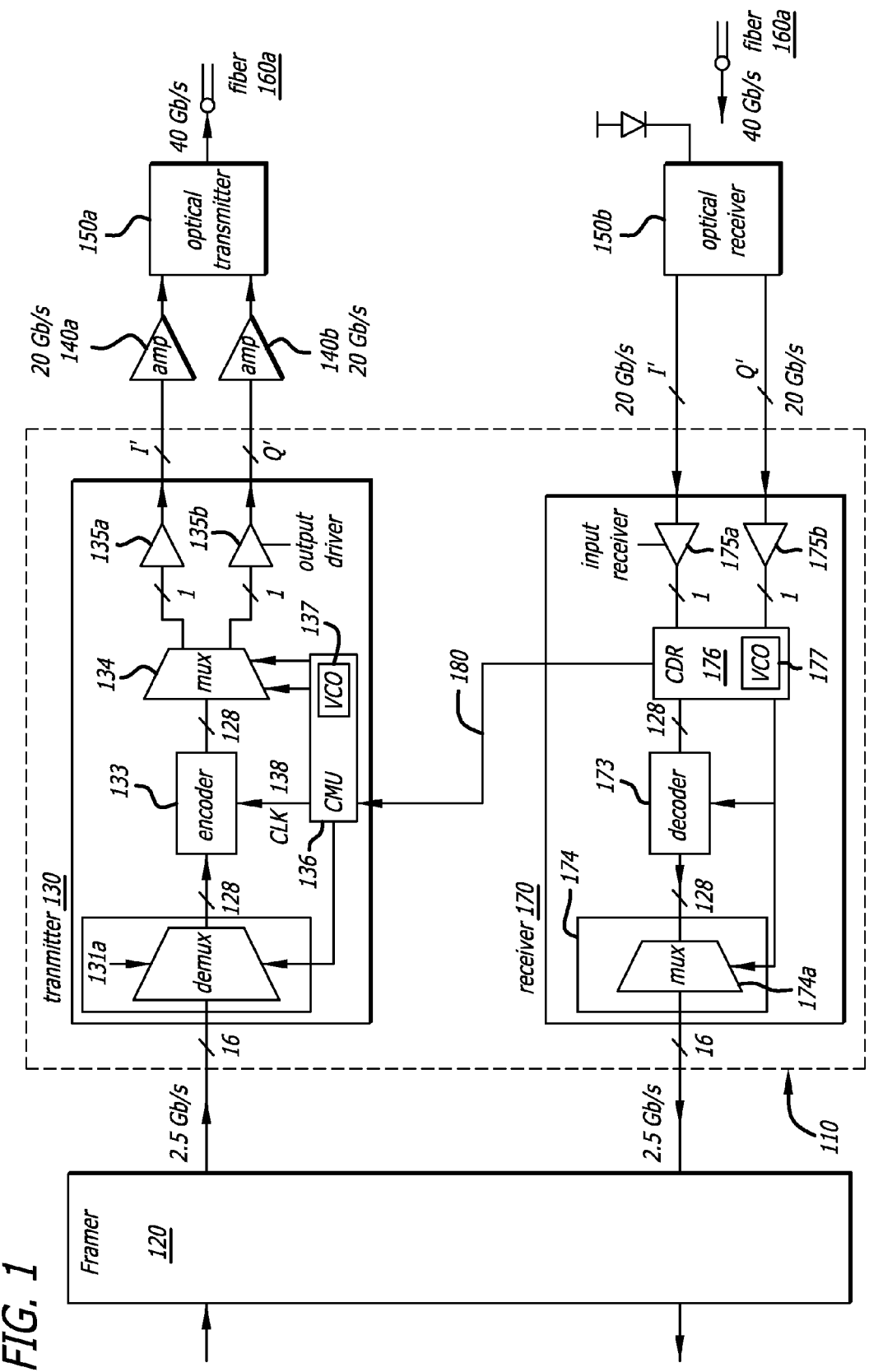
FIG. 1 is a block diagram of a communication system in accordance with one embodiment of the present invention.

FIG. 1 shows a block diagram of a communication system in accordance with one embodiment of the present invention. A transceiver 100 includes a transmitter 130 and a receiver 170. The transmitter 130 is coupled to amplifiers 140a and 140b, an optical transmitter 150a and an optical fiber 160a. The transceiver 100 is also coupled to a framer 120.

In another embodiment, some or all of the following are incorporated into the transceiver 100: the framer 120, amplifiers 140a and 140b, the optical transmitter 150a, the optical receiver 150b and the photo diode 150c.

The transmitter 130 includes a framer interface 131 including, for example, a demultiplexer (demux) 131a. The transmitter 130 further includes an encoder 133, a multiplexer (mux) 134, output drivers 135a and 135b, and a clock multiplier unit 136, which is a type of phase locked loop (PLL). The clock multiplier unit 136 includes a voltage controlled oscillator (VCO) 137 and receives a reference signal 180.

According to one aspect of the present invention, the framer interface 131 of the transmitter 130 receives multiple data channels (e.g., 16 data channels from the framer 120) and converts them into standard digital logic levels. The framer interface 131 may derive a clock from the signals received from the framer 120 and realign the data channels.

The demultiplexer 131a of the transmitter 130 receives 16 data channels in parallel at 2.5 Gb/s from the framer 120. The demultiplexer 131a may convert 16 data channels into 128 data channels in one step using one demultiplexer or in multiple steps using multiple demultiplexers. The encoder receives 128 data channels in parallel: 64 in-phase (i) data channels and 64 quadrature-phase (q) data channels.

The multiplexer 134 receives 128 data channels in parallel and converts them into a pair of i-q data channels. The amplifiers 140a and 140b receives i-q data channels at 20 Gb/s and provides i-q data channels to the optical transmitter 150a at 20 Gb/s. The multiplexer 134 may convert 128 data channels into 2 data channels in one step using one multiplexer or in multiple steps using multiple multipexers (e.g., a 128:16 multiplexer coupled to a 16:2 multiplexer).

The optical transmitter 150a converts electrical signals into optical signals to be transmitted over the optical fiber 160a at 40 Gb/s.

The receiver 170 is coupled to the framer 120, an optical receiver 150b, a photo diode 150 (e.g., a photo detector) and an optical fiber 160b. According to one embodiment, the optical receiver 150b includes a trans-impedance amplifier (TIA).

The receiver 170 includes input receivers 175a and 175b, a clock data recovery unit (CDR) 176, a decoder 173 and a framer interface 174 including, for example, a multiplexer (mux) 174a. The CDR 176 includes a VCO 177 and receives the reference signal 180.

According to one aspect of the present invention, optical signals received via the optical fiber 160b at 40 Gb/s are detected and received by the photo diode 150c. After the photo diode 150c converts the optical signals to electrical current signals, the optical receiver 150b converts the electrical current signals into electrical voltage signals and may amplify the signals at the same time. The optical receiver 150b provides the electrical voltage signals to the input receivers 175a and 175b at 20 Gb/s for each channel.

According to one embodiment, the input receivers 175a and 175b each includes a limiting amplifier and takes an input with varying input voltages and converts it to a single high or low level. It makes amplitude decisions.

The CDR 176 includes a sampler that samples 2 data channels (including clock and data signals). The CDR 176 quantizes the data in time and amplitude and demultiplexes them.

It recovers the clock and data signals. The CDR 176 produces 128 data channels in parallel: 64 in-phase (i) data channels and 64 quadrature-phase (q) data channels.

The CDR 176 can perform with or without a limiting amplifier. If it receives an analog input that has not been operated on by a limiting amplifier, the sampler in the CDR 176 can work at varying levels. The framer interface 174 of the receiver 170 generates a reference channel and buffers the data so that the output data is compatible with the logic and impedance levels and other characteristics required by the interface between the receiver 170 and the framer 120. It should be noted that in another embodiment, some of the components described above with reference to FIG. 1 may be combined or divided into separate parts and/or eliminated.

In FIG. 1, a signal line is indicated with the number of channels or signal channels. For example, on the transmitter side, the signal line between the framer 120 and the transmitter 130 indicates 16 channels; the signal line between the demultiplexer 131*a* and the encoder 133 indicates 128 channels; the signal line between the encoder 133 and the multiplexer 134 indicates 128 channels; the signal line between the multiplexer 134 and the output driver 135*a* has one channel; and the signal line between the output driver 135*a* and the amplifier 140*a* has one channel. The receiver side uses similar notations for the number of channels or signal channels.

Encoding Process

According to one aspect of the present invention, a differential quadrature phase shift key (DQPSK) encoding communication system produces two bit streams in which the bits at any particular time are chosen to represent information encoded relative to the proceeding bits in each bit stream.

Figure 2:
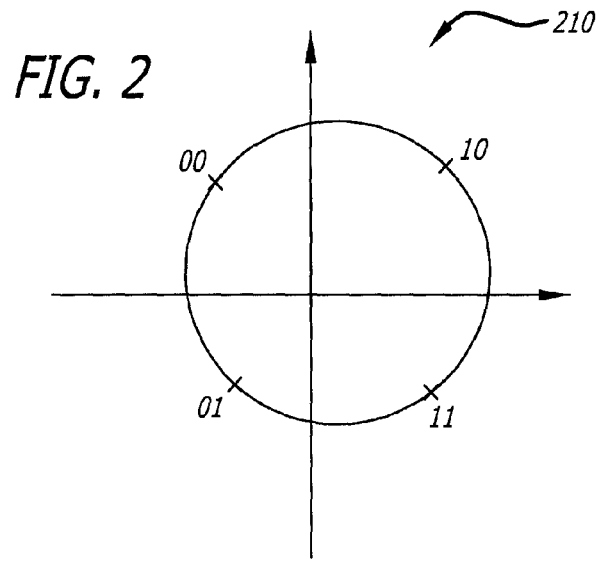
FIG. 2 illustrates an encoding method in accordance with one aspect of the present invention.

FIG. 2 illustrates an encoding method in accordance with one aspect of the present invention. To understand an encoding scheme, a circle 210 is drawn with four vector positions, in which adjacent vectors are at right angles. The four vectors are labeled counterclockwise using the binary designations, 00, 01, 11, and 10. To encode two bits, one moves along the circle 210 from the current position to one of the four possible positions. If the bits to be encoded are 01, the encoded bits are one position clockwise from the current position. If the bits to be encoded are 10, the encoded bits are one position counterclockwise from the current position. If the bits to be encoded are 00, the encoded bits are two positions away from the current position, while if the bits to be encoded are 11, the encoded bits are at the current position. The current position for the next pair of bits is the final position for this set of bits.

This rotational transformation can be represented by the following logic equations:

$$ei(n)=(ui(n)*uq(n)*ei(n-1))+(ui(n)*/uq(n),eq(n-1))+(/ui(n)*/uq(n)*/ei(n-1))+(/ei(n)*eq(n)*/eq(n-1))=Fi(ui(n),uq(n),ei(n-1),eq(n-1))=Fi(bi(n),bq(n),ai(n),aq(n)); \text{ and}$$

$$eq(n)=(ui(n)*uq(n)*eq(n-1))+(/ui(n)*uq(n)*ei(n-1))+(ui(n)*/uq(n)*/ei(n-1))+(/ui(n)*/uq(n)*/eq(n-1))=Fq(ui(n),uq(n),ei(n-1),eq(n-1))=Fq(bi(n),bq(n),ai(n),aq(n)),$$

where ei and eq are the encoded bits, ui and uq are the bits to be encoded, and n is the current time step.

In many systems, performing this transformation at full rate is cumbersome because of the high clock rates involved. Instead, the transform is determined on a number of bit pairs in parallel, which are subsequently serialized into a pair of bit streams. Because the encoding of any set of bits in the parallel data is a function of the encoding of the previous set of bits, one approach to do the encoding of the parallel bits is in series, relying on the last set of bits from the previous set of transformed bits for the starting position.

According to one aspect of the present invention, encoding is pipelined to provide more time to complete the required computations. Pipelining the problem correctly involves some complexity, however, since the values of $ei_m(p-1)$ and $eq_m(p-1)$, the last pair of encoded bits from the previous parallel set, is not known until the final pipeline stage. Pipelining can be used by itself on data encoded serially or in conjunction with a rotational look-ahead scheme. Pipelining encoded data will be first described without the use of rotational look-ahead methods. In this example, m is the number of bits processed in parallel, and p is the modified discrete time steps. This means that p=m*n.

Pipelining Encoded Data

To implement a pipeline scheme in this manner, the following equations are used according to one aspect of the present invention:

$$ei_k(P)=Fi(ui_k(P),uq_k(p),ei_{k-1}(p),eq_{k-1}(p)); \text{ and}$$

$$eq_k(P)=Fq(ui_k(P),uq_k(p),ei_{k-1}(p),eq_{k-1}(p)).$$

However, since $ei_m(p-1)$ and $eq_m(p-1)$ are not available, one needs to take advantage of the fact that the order of rotational operations is not important. Therefore, one needs to modify the equations from above. Starting with the base case, one finds that according to one aspect of the present invention:

$$si_2(p)=Fi(ui_2(p),uq_2(P),ui_1(p),uq_1(p)); \text{ and}$$

$$sq_2(p)=Fq(ui_2(p),uq_2(p),ui_1(p)),uq_1(p)).$$

For the recursive case, the above equations are modified as follows according to one aspect of the present invention:

$$si_k(p)=Fi(ui_k(p),uq_k(p),si_{k-1}(p),sq_{k-1}(p)); \text{ and}$$

$$sq_k(p)=Fq(ui_k(p),uq_k(p),si_{k-1}(p),sq_{k-1}(p)), \text{ for all k from 3 to m.}$$

For the problem of a two-stage pipeline scheme that works properly, one can assume that the ceiling of m/2+1 operations can be successfully computed serially and latched for each pipeline stage. The variables vi and vq are used to store input data to be encoded throughout the pipeline as follows according to one aspect of the present invention:

$$vi_k(p)=ui_k(p-1); \text{ and}$$

$$vq_k(p)=uq_k(p-1), \text{ for all k to ceiling (m/2+1)+1 to m.}$$

The variables wi and wq are introduced as a more generic version of si and sq, that contain pipeline information as follows according to one aspect of the present invention:

$$wi_{1,k}(p)=si_k(p-1); \text{ and}$$

$$wq_{1,k}(p)=sq_k(p-1), \text{ for all k from 2 to ceiling (m/2+1).}$$

Now, in the second pipeline stage, the ei(p) and eq(p) values are computed, since $ei_m(p-1)$ and $eq_m(p-1)$ are available at this point in the computation process. Therefore, according to one aspect of the present invention, one first notes that:

$$ei_k(p)=Fi(wi_k(p),wq_k(p),ei_m(p-1),eq(p-1)); \text{ and}$$

$$eq_k(p)=Fq(wi_k(p),wq_k(p),ei_m(p-1),eq_m(p-1)), \text{ for all k from 1 to ceiling (m/2+1),}$$

since all that is left to produce new sets of encoded bits from the ui and uq bits is to reference these products to the set of previously encoded bits.

For the vi and vq bits, the computed di and dq bits are used to begin encoding these remaining unencoded values serially using the now familiar equations as follows in accordance with one aspect of the present invention:

$$ei_k(p)=Fi(vi_k(p),vq_k(p),ei_{k-1}(p),eq_{k-1}(p)); \text{ and}$$

$$eq_k(p)=Fq(vi_k(p),vq_k(p),ei_{k-1}(p),eq_{k-1}(p)), \text{ for all k from ceiling } (m/2+1)+1 \text{ to m}.$$

According to one embodiment of the present invention, this procedure for pipelining bits encoded serially can be extended to many pipeline stages in the following manner. Divide the m pairs of bits to be encoded into arbitrary sets for computation at each pipeline stage, where x_1, x_2, etc. equal the last k values for various stages. Let kf be the total pipeline stages, while y is used to indicate the current pipeline stage. At each consecutive pipeline stage, another set of rotational products si and sq is computed, and stored in wi and wq.

According to one embodiment, pipeline stage one equations are as follows:

$$wi_{1,k}(p)=si_k(p-1); \text{ and}$$

$$wq_{1,k}(p)=sq_k(p-1), \text{ for all k from 2 to x\_1}.$$

Similarly, $$vi_{1,k}(p)=ui_k(p-1); \text{ and}$$

$$vq_{1,k}(p)=uq_k(p-1), \text{ for all k from x\_1+1 to m}.$$

According to one embodiment, pipeline stage y equations are as follows (where y is any stage but the first or last stage):

$$wi_{y,k}(p)=wi_{y-1,k}(p-1); \text{ and}$$

$$wq_{y,k}(p)=wq_{y-1,k}(p-1), \text{ for all k from 1 through x\_y-1}.$$

Similar to si and sq, the following can also be defined for wi and wq according to one aspect of the present invention:

$$wi_{y,k}(p)=Fi(vi_{y-1,k}(p),vq_{y-1,k}(p),wi_{y-1,k-1}(p),wq_{y-1,k-1}(p)); \text{ and}$$

$$wq_{y,k}(p)=Fq(vi_{y-1,k}(p),vq_{y-1,k}(p),wi_{y-1,k-1}(p),wq_{y-1,k-1}(p)), \text{ for k from x\_y-1+1 to x\_y and for ko of x\_y-1}.$$

In accordance with one aspect of the present invention, since pipelining bi and bq values need to be kept:

$$vi_{y,k}(p)=vi_{y-1,k}(p-1); \text{ and}$$

$$vi_{y,k}(p)=vi_{y-1,k}(p-1), \text{ for k from x\_y+1 to m}.$$

For the final stage, most di and dq values are computed as follows according to one aspect of the present invention:

$$ei_k(p)=Fi(wi_{kf,k}(p),wq_{kf,k}(p),ei_m(p-1),eq_m(p-1)); \text{ and}$$

$$eq_k(p)=Fq(wi_{kf,k}(p),wq_{kf,k}(p),ei_m(p-1),eq_m(p-1)), \text{ for all k from 1 to x\_kf-1}.$$

According to one aspect, the rest of the ei and eq values are generated from using the previous ei and eq values as follows:

$$ei_k(p)=Fi(vi_{kf-1,k}(p),vq_{kf-1,k}(p),ei_{k-1}(p),eq_{k-1}(p)); \text{ and}$$

$$eq_k(p)=Fq(vi_{kf-1,k}(p),vq_{kf-1,k}(p),ei_{k-1}(p),eq_{k-1}(p)), \text{ for all k from x\_kf-1+1 to m}.$$

According to one embodiment of the present invention, an exemplary set of equations derived using this method for m=4, pipelined such that kf=2, x_1=3, and x-2=4 is provided as follows (see FIG. 5):

$$si_2(p)=Fi(ui_2(p),uq_2(p),ui_1(p),uq_1(p));$$

$$sq_2(p)=Fq(ui_2(p),uq_2(p),ui_1(p),uq_1(p));$$

$$si_3(p)=Fi(ui_3(p),uq_3(p),si_2(p),sq_2(p));$$

$$sq_3(p)=Fq(ui_3(p),uq_3(p),si_2(p),sq_2(p));$$

$$wi_{1,2}(p)=si_2(p-1);$$

$$wq_{1,2}(p)=sq_2(p-1);$$

$$wi_{1,3}(p)=si_3(p-1);$$

$$wq_{1,3}(p)=sq_3(p-1);$$

$$vi_{1,1}(p)=ui_1(p-1);$$

$$vq_{1,1}(p)=uq_1(p-1);$$

$$vi_{1,4}(p)=ui_4(p-1);$$

$$vq_{1,4}(p)=uq_4(p-1);$$

$$wi_{1,4}(p)=Fi(vi_{1,4}(p),vq_{1,4}(p),wi_{1,3}(p),wq_{1,3}(p));$$

$$wq_{1,4}(p)=Fq(vi_{1,4}(p),vq_{1,4}(p),wi_{1,3}(p),wq_{1,3}(p));$$

$$ei_1(p)=Fi(wi_{1,1}(p),wq_{1,1}(p),ei_4(p-1),eq_4(p-1));$$

$$eq_1(p)=Fq(wi_{1,1}(p),wq_{1,1}(p),ei_4(p-1),eq_4(p-1));$$

$$ei_2(p)=Fi(wi_{1,2}(p),wq_{1,2}(p),ei_4(p-1),eq_4(p-1));$$

$$eq_2(p)=Fq(wi_{1,2}(p),wq_{1,2}(p),ei_4(p-1),eq_4(p-1));$$

$$ei_3(p)=Fi(wi_{1,3}(p),wq_{1,3}(p),ei_4(p-1),eq_4(p-1));$$

$$eq_3(p)=Fq(wi_{1,3}(p),wq_{1,3}(p),ei_4(p-1),eq_4(p-1));$$

$$ei_4(p)=Fi(wi_{1,4}(p),wq_{1,4}(p),ei_4(p-1),eq_4(p-1)); \text{ and}$$

$$eq_4(p)=Fq(wi_{1,4}(p),wq_{1,4}(p),ei_4(p-1),eq_4(p-1)).$$

According to one embodiment of the present invention, an exemplary set of equations derived using this method for m=8, pipelined such that kf=3, x_1=3, x_2=6, and x_3=8 is provided as follows:

$$si_2(p)=Fi(ui_2(p),uq_2(p),ui_1(p),uq_1(p));$$

$$sq_2(p)=Fq(ui_2(p),uq_2(p),ui_1(p),uq_1(p));$$

$$si_3(p)=Fi(ui_3(p),uq_3(p),si_2(p),sq_2(p));$$

$$sq_3(p)=Fq(ui_3(p),uq_3(p),si_2(p),sq_2(p));$$

$$wi_{1,2}(p)=si_2(p-1);$$

$$wq_{1,2}(p)=sq_2(p-1);$$

$$wi_{1,3}(p)=si_3(p-1);$$

$$wq_{1,3}(p)=sq_3(p-1);$$

$$vi_{1,1}(p)=ui_1(p-1);$$

$$vq_{1,1}(p)=uq_1(p-1);$$

$$vi_{1,4}(p)=ui_4(p-1);$$

$$vq_{1,4}(p)=uq_4(p-1);$$

$$vi_{1,5}(p)=ui_5(p-1);$$

$$vq_{1,5}(p)=uq_5(p-1);$$

$$vi_{1,6}(p)=ui_6(p-1);$$

$$vq_{1,6}(p)=uq_6(p-1);$$

$vi_{1,7}(p)=ui_7(p-1);$ $vq_{1,7}(p)=uq_7(p-1);$ $vi_{1,8}(p)=ui_8(p-1);$ $vq_{1,8}(p)=uq(p-1);$ $wi_{1,4}(p)=Fi(vi_{1,4}(p),vq_{1,4}(p),wi_{1,3}(p),wq_{1,3}(p));$ $wq_{1,4}(p)=Fq(vi_{1,4}(p),vq_{1,4}(p),wi_{1,3}(p),wq_{1,3}(p));$ $wi_{1,5}(p)=Fi(vi_{1,5}(p),vq_{1,5}(p),wi_{2,4}(p),wq_{2,4}(p));$ $wq_{1,5}(p)=Fq(vi_{1,5}(p),vq_{1,5}(p),wi_{2,4}(p),wq_{2,4}(p));$ $wi_{1,6}(p)=Fi(vi_{1,6}(p),vq_{1,6}(p),wi_{2,5}(p),wq_{2,5}(p));$ $wq_{1,6}(p)=Fq(vi_{1,6}(p),vq_{1,6}(p),wi_2s_5(p),wq_{2,5}(p));$ $wi_{2,1}(p)=wi_{1,1}(p-1);$ $wq_{2,1}(p)=wq_{1,1}(p-1);$ $wi_{2,2}(p)=wi_{1,2}(p-1);$ $wq_{2,2}(p)=wq_{1,2}(p-1);$ $wi_{2,3}(p)=wi_{1,3}(p-1);$ $wq_{2,3}(p)=wq_{1,3}(p-1);$ $wi_{2,4}(p)=wi_{2,4}(p-1);$ $wq_{2,4}(p)=wq_{2,4}(p-1);$ $wi_{2,5}(p)=wi_{2,5}(p-1);$ $wq_{2,5}(p)=wq_{2,5}(p-1);$ $wi_{2,6}(p)=wi_{2,6}(p-1);$ $wq_{2,6}(p)=wq_{2,6}(p-1);$ $vi_{2,7}(p)=vi_{1,7}(p-1);$ $vq_{2,7}(p)=vq_{1,7}(p-1);$ $vi_{2,8}(p)=vi_{1,8}(p-1);$ $vq_{2,8}(p)=vq_{1,8}(p-1);$ $ei_1(p)=Fi(wi_{2,1}(p),wq_{2,1}(p),ei_8(p-1),eq_8(p-1));$ $eq_1(p)=Fq(wi_{2,1}(p),wq_{2,1}(p),ei_8(p-1),eq_8(p-1));$ $ei_2(p)=Fi(wi_{2,2}(p),wq_{2,2}(p),ei_8(p-1),eq_8(p-1));$ $eq_2(p)=Fq(wi_{2,2}(p),wq_{2,2}(p),ei_8(p-1),eq_8(p-1));$ $ei_3(p)=Fi(wi_{2,3}(p),wq_{2,3}(p),ei_8(p-1),eq_8(p-1));$ $eq_3(p)=Fq(wi_{2,3}(p),wq_{2,3}(p),ei_8(p-1),eq_8(p-1));$ $ei_4(p)=Fi(wi_{2,4}(p),wq_{2,4}(p),ei_8(p-1),eq_8(p-1));$ $eq_4(p)=Fq(wi_{2,4}(p),wq_{2,4}(p),ei_8(p-1),eq_8(p-1));$ $ei_5(p)=Fi(wi_{2,5}(p),wq_{2,5}(p),ei_8(p-1),eq_8(p-1));$ $eq_5(p)=Fq(wi_{2,5}(p),wq_{2,5}(p),ei_8(p-1),eq_8(p-1));$ $ei_6(p)=Fi(wi_{2,6}(p),wq_{2,6}(p),ei_8(p-1),eq_8(p-1));$ $eq_6(p)=Fq(wi_{2,6}(p),wq_{2,6}(p),ei_8(p-1),eq_8(p-1));$ $ei_7(p)=Fi(vi_{2,7}(p),vq_{2,7}(p),ei_6(p),eq_6(p));$ $eq_7(p)=Fq(vi_{2,7}(p),vq_{2,7}(p),ei_6(p),eq_6(p));$ $ei_8(p)=Fi(vi_{2,8}(p),vq_{2,8}(p)ei_7(p),eq_7(p));$ and $eq_8(p)=Fq(vi_{2,8}(p),vq_{2,8}(p),ei_7(p),eq_7(p)).$ Pipelining with a Rotational Look-ahead Scheme Using a rotational look-ahead scheme with pipelining allows more computations to be performed in each pipeline stage, which can reduce the number of overall stages required to perform the encoding. The technique for pipelining with a rotational look-ahead scheme is similar to the technique for pipelining encoded data described above. As before, $ei_m(p-1)$ and $eq_m(p-1)$ are not available until the last pipeline stage. Therefore, the property that the order of the rotations is not important is again crucial to pipelining using the rotational look-ahead scheme. Here, m is the number of bits processed in parallel, and p is the modified discrete time steps. This means that $p=m*n$.

Similar to vi and vq, hi and hq are pipelined versions of bi and bq, as follows according to one embodiment of the present invention:

$hi_{1,k}(p)=bi_k(p-1);$ and $hq_{1,k}(p)=bq_k(p-1),$ for $k<=m.$

Furthermore, $hi_{y,k}(p)=hi_{y-1,k}(p-1);$ and $hq_{y,k}(p)=hq_{y-1,k}(p-1),$ for $y>1$ and $k<=m.$ Similar to wi and wq, gi and gq are rotational products in the pipeline, and are expressed in the parallel case as follows according to one embodiment of the present invention:

$gi_{1,k,ko}(p)=ri_{k,ko}(p-1);$ and $gq_{1,k,ko}(p)=rq_{k,ko}(p-1),$ for $k>ko,$ and $k<=m$ for the first stage.

For subsequent stages:

$gi_{y,k,ko}(p)=Fi(gi_{y,k,kd}(p),gq_{y,k,kd}(p),gi_{y,kd-1,ko}(p),gq_{y,kd-1,ko}(p));$ and $gq_{y,k,ko}(p)=Fq(gi_{y,k,kd}(p),gq_{y,k,kd}(p),gi_{y,kd-1,ko}(p),gq_{y,kd-1,ko}(p)),$ for $y>=1,$ $k>kd>ko,$ and $k<=m.$ Moreover, $gi_{y,k,ko}(p)=Fi(hi_{y,k}(p),hq_{y,k}(p),gi_{y,k-1,ko}(p),gq_{y,k-1,ko}(p));$ and $gq_{y,k,ko}(p)=Fq(hi_{y,k}(p),hq_{y,k}(p),gi_{y,k-1,ko}(p)gq_{y,k-1,ko}(p)),$ for $y>=1,$ $k>ko,$ and $k<=m.$ Finally, ei and eq are provided in the last pipeline stage as follows according to one embodiment of the present invention:

$ei_k(p)=gi_{kf-1,k,0}(p)=Fi(gi_{kf-1,k,1}(p),gq_{kf-1,k,1}(p),ei_m(p-1),eq_m(p-1));$ and $eq_k(p)=gq_{kf-1,k,0}(p)=Fq(gi_{kf-1,k,1}(p),gq_{kf-1,k,1}(p),ei_m(p-1),eq_m(p-1)),$ for all k from 1 to m, where kf is the number of pipeline stages.

Using these equations, a rotational look-ahead and pipelining are combined to perform DQPSK encoding in parallel according to one embodiment of the present invention. This parallel encoded data can then be serialized into a pair of DQPSK encoded i-q bit streams.

An exemplary set of equations derived using this method for m=4, and assuming only one set of rotational operations in series per pipeline stage, is provided as follows (see FIG. 6):

$$ri_{2,1}(p)=Fi(ui_2(p),uq_2(p),ui_1(p),uq_1(p));$$

$$rq_{2,1}(p)=Fq(ui_2(p),uq_2(p),ui_1(p),uq_1(p));$$

$$ri_{4,3}(p)=Fi(ui_4(p),uq_4(p),ui_3(p),uq_3(p));$$

$$rq_{4,3}(p)=Fq(ui_4(p),uq_4(p),ui_3(p),uq_3(p));$$

$$gi_{1,2,1}(p)=ri_{2,1}(p-1);$$

$$gq_{1,2,1}(p)=rq_{2,1}(p-1);$$

$$gi_{1,4,3}(p)=ri_{4,3}(p-1);$$

$$gq_{1,4,3}(p)=rq_{4,3}(p-1);$$

$$hi_{1,1}(p)=ui_1(p-1);$$

$$hq_{1,1}(p)=uq_1(p-1);$$

$$hi_{1,3}(p)=ui_3(p-1);$$

$$hq_{1,3}(p)=uq_3(p-1);$$

$$gi_{1,4,1}(p)=Fi(gi_{1,4,3}(p),gq_{1,4,3}(p),gi_{1,2,1}(p),gq_{1,2,1}(p));$$

$$gq_{1,4,1}(p)=Fq(gi_{1,4,3}(p),gq_{1,4,3}(p),gi_{1,2,1}(p),gq_{1,2,1}(p));$$

$$gi_{1,3,1}(p)=Fi(hi_{1,3}(p),hq_{1,3}(p),gi_{1,2,1}(p),gq_{1,2,1}(p));$$

$$gq_{1,3,1}(p)=Fq(hi_{1,3}(p),hq_{1,3}(p),gi_{1,2,1}(p),gq_{1,2,1}(p));$$

$$gi_{2,2,1}(p)=gi_{1,2,1}(p-1);$$

$$gq_{2,2,1}(p)=gq_{1,2,1}(p-1);$$

$$gi_{2,3,1}(p)=gi_{1,3,1}(p-1);$$

$$gq_{2,3,1}(p)=gq_{1,3,1}(p-1);$$

$$gi_{2,4,1}(p)=gi_{1,4,1}(p-1);$$

$$gq_{2,4,1}(p)=gq_{1,4,1}(p-1);$$

$$hi_{2,1}(p)=hi_{1,1}(p-1);$$

$$hq_{2,1}(p)=hq_{1,1}(p-1);$$

$$ei_4(p)=gi_{2,4,0}(p)=Fi(gi_{2,4,1}(p),gq_{2,4,1}(p),ei_4(p-1),eq_4(p-1));$$

$$eq_4(p)=gq_{2,4,0}(p)=Fq(gi_{2,4,1}(p),gq_{2,4,1}(p),ei_4(p-1),eq_4(p-1));$$

$$ei_3(p)=gi_{2,3,0}(p)=Fi(gi_{2,3,1}(p),gq_{2,3,1}(p),ei_4(p-1),eq_4(p-1));$$

$$eq_3(p)=gq_{2,3,0}(p)=Fq(gi_{2,3,1}(p),gq_{2,3,1}(p),ei_4(p-1)),eq_4(p-1));$$

$$ei_2(p)=gi_{2,2,0}(p)=Fi(gi_{2,2,1}(p),gq_{2,2,1}(p),ei_4(p-1),eq_4(p-1));$$

$$eq_2(p)=gq_{2,2,0}(p)=Fq(gi_{2,2,1}(p),gq_{2,2,1}(p),ei_4(p-1),eq_4(p-1));$$

$$ei_1(p)=gi_{2,1,0}(p)=Fi(hi_{4,1}(p),hq_{4,1}(p),ei_4(p-1),eq_4(p-1));\text{ and}$$

$$eq_1(p)=gq_{2,1,0}(p)=Fq(hi_{4,1}(p),hq_{4,1}(p),ei_4(p-1),eq_4(p-1)).$$

An exemplary set of equations derived using this method for m=8, and assuming only one set of rotational operations in series per pipeline stage, is provided as follows:

$$ri_{2,1}(p)=Fi(ui_2(p),uq_2(p),ui_1(p),uq_1(p));$$

$$rq_{2,1}(p)=Fq(ui_2(p),uq_2(p),ui_1(p),uq_1(p));$$

$$ri_{4,3}(p)=Fi(ui_4(p),uq_4(p),ui_3(p),uq_3(p));$$

$$rq_{4,3}(p)=Fq(ui_4(p),uq_4(p),ui_3(p),uq_3(p));$$

$$ri_{6,5}(p)=Fi(ui_6(p),uq_6(p),ui_5(p),uq_5(p));$$

$$rq_{6,5}(p)=Fq(ui_6(p)uq_6(p),ui_5(p)uq_5(p));$$

$$ri_{8,7}(p)=Fi(ui_8(p),uq_8(p),ui_7(p),uq_7(p));$$

$$rq_{8,7}(p)=Fq(ui_8(p),uq_8(p),ui_7(p),uq_7(p));$$

$$gi_{1,2,1}(p)=ri_{2,1}(p-1);$$

$$gq_{1,2,1}(p)=rq_{2,1}(p-1);$$

$$gi_{1,4,3}(p)=ri_{4,3}(p-1);$$

$$gq_{1,4,3}(p)=rq_{4,3}(p-1);$$

$$gi_{1,6,5}(p)=ri_{6,5}(p-1);$$

$$gq_{1,6,5}(p)=rq_{6,5}(p-1);$$

$$gi_{1,8,7}(p)=ri_{8,7}(p-1);$$

$$gq_{1,8,7}(p)=rq_{8,7}(p-1);$$

$$hi_{1,1}(p)=ui_1(p-1);$$

$$hq_{1,1}(p)=uq_1(p-1);$$

$$hi_{1,3}(p)=ui_3(p-1);$$

$$hq_{1,3}(p)=uq_3(p-1);$$

$$hi_{1,5}(p)=ui_5(p-1);$$

$$hq_{1,5}(p)=uq_5(p-1);$$

$$hi_{1,7}(p)=ui_7(p-1);$$

$$hq_{1,7}(p)=uq_7(p-1);$$

$$gi_{1,4,1}(p)=Fi(gi_{1,4,3}(p),gq_{1,4,3}(p),gi_{1,2,1}(p),gq_{1,2,1}(p));$$

$$gq_{1,4,1}(p)=Fq(gi_{1,4,3}(p),gq_{1,4,3}(p),gi_{1,2,1}(p),gq_{1,2,1}(p));$$

$$gi_{1,8,5}(p)=Fi(gi_{1,8,7}(p),gq_{1,8,7}(p),gi_{1,6,5}(p),gq_{1,6,5}(p));$$

$$gq_{1,8,5}(p)=Fq(gi_{1,8,7}(p),gq_{1,8,7}(p),gi_{1,6,5}(p),gq_{1,6,5}(p));$$

$$gi_{1,6,3}(p)=Fi(gi_{1,6,5}(p),gq_{1,6,5}(p),gi_{1,4,3}(p),gq_{1,4,3}(p));$$

$$gq_{1,6,3}(p)=Fq(gi_{1,6,5}(p),gq_{1,6,5}(p),gi_{1,4,3}(p),gq_{1,4,3}(p));$$

$$gi_{1,3,1}(p)=Fi(hi_{1,3}(p),hq_{1,3}(p),gi_{1,2,1}(p),gq_{1,2,1}(p));$$

$$gq_{1,3,1}(p)=Fq(hi_{1,3}(p),hq_{1,3}(p),gi_{1,2,1}(p),gq_{1,2,1}(p));$$

$$gq_{2,2,1}(p)=gq_{1,2,1}(p-1);$$

$$gi_{2,3,1}(p)=gi_{1,3,1}(p-1);$$

$$gq_{2,3,1}(p)=gq_{1,3,1}(p-1);$$

$gi_{2,4,1}(p)=gi_{1,4,1}(p-1);$ $gq_{2,4,1}(p)=gq_{1,4,1}(p-1);$ $gi_{2,8,5}(p)=gi_{1,8,5}(p-1);$ $gq_{2,8,5}(p)=gq_{1,8,5}(p-1);$ $gi_{2,6,3}(p)=gi_{1,6,3}(p-1);$ $gq_{2,6,3}(p)=gq_{1,6,3}(p-1);$ $gi_{2,3,1}(p)=gi_{1,3,1}(p-1);$ $gq_{2,3,1}(p)=gq_{1,3,1}(p-1);$ $hi_{2,1}(p)=hi_{1,1}(p-1);$ $hq_{2,1}(p)=hq_{1,1}(p-1);$ $hi_{2,5}(p)=hi_{1,5}(p-1);$ $hq_{2,5}(p)=hq_{1,5}(p-1);$ $hi_{2,7}(p)=hi_{1,7}(p-1);$ $hq_{2,7}(p)=hq_{1,7}(p-1);$ $gi_{2,8,1}(p)=Fi(gi_{2,8,5}(p),gq_{2,8,5}(p),gi_{2,4,1}(p),gq_{2,4,1}(p));$ $gq_{2,8,1}(p)=Fq(gi_{2,8,5}(p),gq_{2,8,5}(p),gi_{2,4,1}(p),gq_{2,4,1}(p));$ $gi_{2,6,1}(p)=Fi(gi_{2,6,3}(p),gq_{2,6,3}(p),gi_{2,2,1}(p),gq_{2,2,1}(p));$ $gq_{2,6,1}(p)=Fq(gi_{2,6,3}(p),gq_{2,6,3}(p),gi_{2,2,1}(p),gq_{2,2,1}(p));$ $gi_{2,5,1}(p)=Fi(hi_{2,5}(p),hq_{2,5}(p),gi_{2,4,1}(p),gq_{2,4,1}(p));$ $gq_{2,5,1}(p)=Fq(hi_{2,5}(p),hq_{2,5}(p),gi_{2,4,1}(p),gq_{2,4,1}(p));$ $gi_{3,2,1}(p)=gi_{2,2,1}(p-1);$ $gq_{3,2,1}(p)=gq_{2,2,1}(p-1);$ $gi_{3,3,1}(p)=gi_{2,3,1}(p-1);$ $gq_{3,3,1}(p)=gq_{2,3,1}(p-1);$ $gi_{3,4,1}(p)=gi_{2,4,1}(p-1);$ $gq_{3,4,1}(p)=gq_{2,4,1}(p-1);$ $gi_{3,5,1}(p)=gi_{2,5,1}(p-1);$ $gi_{3,5,1}(p)=gi_{2,5,1}(p-1);$ $gi_{3,6,1}(p)=gi_{2,6,1}(p-1);$ $gi_{3,6,1}(p)=gi_{2,6,1}(p-1);$ $gi_{3,8,1}(p)=gi_{2,8,1}(p-1);$ $gi_{3,8,1}(p)=gi_{2,8,1}(p-1);$ $hi_{3,1}(p)=hi_{2,1}(p-1);$ $hq_{3,1}(p)=hq_{2,1}(p-1);$ $hi_{3,7}(p)=hi_{2,7}(p-1);$ $hq_{3,7}(p)=hq_{2,7}(p-1);$ $gi_{3,7,1}(p)=Fi(hi_{3,7}(p),hq_{3,7}(p),gi_{3,6,1}(p),gq_{3,6,1}(p));$ $gq_{3,7,1}(\ )=Fq(hi_{3,7}(p),hq_{3,7}(p),gi_{3,6,1}(p),gq_{3,6,1}(p));$ $gi_{4,2,1}(p)=gi_{3,2,1}(p-1);$ $gq_{4,2,1}(p)=gq_{3,2,1}(p-1);$ $gi_{4,3,1}(p)=gi_{3,3,1}(p-1);$ $gq_{4,3,1}(p)=gq_{3,3,1}(p-1);$ $gi_{4,4,1}(p)=gi_{3,4,1}(p-1);$ $gq_{4,4,1}(p)=gq_{3,4,1}(p-1);$ $gi_{4,5,1}(p)=gi_{3,5,1}(p-1);$ $gi_{4,5,1}(p)=gi_{3,5,1}(p-1);$ $gi_{4,6,1}(p)=gi_{3,6,1}(p-1);$ $gi_{4,6,1}(p)=gi_{3,6,1}(p-1);$ $gi_{4,7,1}(p)=gi_{3,7,1}(p-1);$ $gi_{4,7,1}(p)=gi_{3,7,1}(p-1);$ $gi_{4,8,1}(p)=gi_{3,8,1}(p-1);$ $gi_{4,8,1}(p)=gi_{3,8,1}(p-1);$ $hi_{4,1}(p)=hi_{3,1}(p-1);$ $hq_{4,1}(p)=hq_{3,1}(p-1);$ $ei_8(p)=gi_{4,8,0}(p)=Fi(gi_{4,8,1}(p),gq_{4,8,1}(p),ei_8(p-1),eq_8(p-1));$ $eq_8(p)=gq_{4,8,0}(p)=Fq(gi_{4,8,1}(p),gq_{4,8,1}(p),ei_8(p-1),eq_8(p-1));$ $ei_7(p)=gi_{4,7,0}(p)=Fi(gi_{4,7,1}(p),gq_{4,7,1}(p),ei_8(p-1),eq_8(p-1));$ $eq_7(p)=gq_{4,7,0}(p)=Fq(gi_{4,7,1}(p),gq_{4,7,1}(p),ei_8(p-1),eq_8(p-1));$ $ei_6(p)=gi_{4,6,0}(p)=Fi(gi_{4,6,1}(p),gq_{4,6,1}(p),ei_8(p-1),eq_8(p-1));$ $eq_6(p)=gq_{4,6,0}(p)=Fq(gi_{4,6,1}(p),gq_{4,6,1}(p),ei(p-1),eq(p-1));$ $ei_5(p)=gi_{4,5,0}(p)=Fi(gi_{4,5,1}(p),gq_{4,5,1}(p),ei_8(p-1),eq_8(p-1));$ $eq_5(p)=gq_{4,5,0}(p)=Fq(gi_{4,5,1}(p),gq_{4,5,1}(p),ei_8(p-1),eq_8(p-1));$ $ei_4(p)=gi_{4,4,0}(p)=Fi(gi_{4,4,1}(p),gq_{4,4,1}(p),ei_8(p-1),eq_8(p-1));$ $eq_4(p)=gq_{4,4,0}(p)=Fq(gi_{4,4,1}(p),gq_{4,4,1}(p),ei_8(p-1)eq_8(p-1));$ $ei_3(p)=gi_{4,3,0}(p)=Fi(gi_{4,3,1}(p),gq_{4,3,1}(p),ei_8(p-1)eq_8(p-1));$ $eq_3(p)=gq_{4,3,0}(p)=Fq(gi_{4,3,1}(p),gq_{4,3,1}(p),ei_8(p-1),eq_8(p-1));$ $ei_2(p)=gi_{4,2,0}(p)=Fi(gi_{4,2,1}(p),ei_8(p-1),eq_8(p-1));$ $eq_2(p)=gq_{4,2,0}(p)=Fq(gi_{4,2,1}(p),gq_{4,2,1}(p),ei_8(p-1),eq_8(p-1));$ $ei_1(p)=gi_{4,1,0}(p)=Fi(hi_{4,1}(p),hq_{4,1}(p),ei_8(p-1),eq_8(p-1))$; and $eq_1(p)=gq_{4,1,0}(p)=Fq(hi_{4,1}(p),hq_{4,1}(p),ei_8(p-1),eq_8(p-1))$.

According to one aspect of the present invention, for any k pair of bits in set m, the order in which the rotational operations are performed to get to the final position for an encoded pair of k bits does not affect the final rotated position. This means that rotational operations between adjacent bit pairs can be computed in parallel, creating partial rotational products that can be used to determine final rotational values for all m encoded bits. In this way, the time to complete all m encoded values goes from O(p) to O(log p). In other words, the total computational time goes from a linear function of the number of parallel bits to a logarithmic function of the total number of bits using this look-ahead technique. A parallel (or rotational look-ahead) method of computing the encoded bits provides a computation time that is logarithmically related to the number of bit pairs.

Decoding Process

According to one aspect of the present invention, the encoded bit streams are combined into an optical signal that is transmitted over an optical fiber. When the optical signal is received at the fiber destination, it is normally decoded optically at full rate. The rotational inverse transform allows one to determine the original unencoded pair of bits based on the current and previous pairs of encoded bits. One compares the relative vector positions of the two pairs of bits on the circle described above with respect to FIG. 2, and determines the bits that were encoded from the difference in the two positions.

This rotational inverse transform is represented by the following logic equations according to one embodiment of the present invention:

$ui(n)=(/ei(n-1)*/eq(n-1)*/ei(n))+(ei(n-1)*eq(n-1)*ei(n))+(/ei(n-1)*eq(n-1)*eq(n))+(ei(n-1)*/eq(n-1)*/eq(n))=Gi(ei(n),eq(n),ei(n-1),eq(n-1))=Gi(bi(n),bq(n),ai(n),aq(n))$; and $uq(n)=(/ei(n-1)*/eq(n-1)*/eq(n))+(/ei(n-1)*eq(n-1)*/ei(n))+(ei(n-1)*/eq(n-1)*ei(n))+(ei(n-1)*eq(n-1)*eq(n))=Gq(ei(n),eq(n),ei(n-1),eq(n-1))=Gq(bi(n),bq(n),ai(n),aq(n))$, where ei and eq are the encoded bits, ui and uq are the decoded bits, and n is the current time step.

According to one embodiment, a parallel decoder is created for use in test equipment to evaluate the serial rate encoded bit streams when an optical decoder is not in use. In this case, the encoded data is received and demultiplexed, producing a parallel set of encoded data, since it is often difficult to do the decoding electrically at the serial rate.

To decode the bits in parallel according to one embodiment, since:

$ui(n)=Gi(ei(n),eq(n),ei(n-1),eq(n-1))$; and $uq(n)=Gq(ei(n),eq(n),ei(n-1),eq(n-1))$ then:

$ui(n+k)=Gi(ei(n+k),eq(n+k),ei(n+k-1),eq(n+k-1))$; and $uq(n+k)=Gq(ei(n+k),eq(n+k),ei(n+k-1),eq(n+k-1))$.

Now, let m be the number of bits processed in parallel and p be the modified discrete time steps. This means that p=m*n.

The first set of equations as a function of time step p is provided as follows according to one embodiment of the present invention:

$ui_k(p)=Gi(ei_k(p),eq_k(p),ei_{k-1}(p),eq_{k-1}(p))$; and $uq_k(p)=Gq(ei_k(p),eq_k(p),ei_{k-1}(p),eq_{k-1}(p))$, for all k from 1 to m. $ei_k(p)$ and $eq_k(p)$ from 1 to m are the parallel encoded input bits, while $ui_k(p)$ and $uq_k(p)$ are the parallel decoded output bits. Furthermore, $ei_0(p)=ei_m(p-1)$; and $eq_0(p)=eq_m(p-1)$.

A block diagram illustrating these equations is shown in FIG. 7. Since there is no feedback of decoded bits in the decoding scheme, the decoding of parallel bits is accomplished by decoding the bits in a parallel manner using the above equations.

An exemplary set of equations derived using this method for m=4 is provided as follows according to one embodiment of the present invention:

$ui_1(p)=Fi(ei_1(p),eq_1(p),ei_4(p-1),eq_4(p-1))$;

$uq_1(p)=Fq(ei_1(p),eq_1(p),ei_4(p-1),eq_4(p-1))$;

$ui_2(p)=Fi(ei_2(p),eq_2(p),ei_1(p),eq_1(p))$;

$uq_2(p)=Fq(ei_2(p),eq_2(p),ei_1(p),eq_1(p))$;

$ui_3(p)=Fi(ei_3(p),eq_3(p),ei_2(p),eq_2(p))$;

$uq_3(p)=Fq(ei_3(p),eq_3(p),ei_2(p),eq_2(p))$;

$ui_4(p)=Fi(ei_4(p),eq_4(p),ei_3(p),eq_3(p))$; and $uq_4(p)=Fq(ei_4(p),eq_4(p),ei_3(p),eq_3(p))$.

An exemplary set of equations derived using this method for m=8 is provided as follows according to one embodiment of the present invention:

$ui_1(p)=Fi(ei_1(p),eq_1(p),ei_8(p-1),eq_8(p-1))$;

$uq_1(p)=Fq(ei_1(p),eq_1(p),ei_8(p-1),eq_8(p-1))$;

$ui_2(p)=Fi(ei_2(p),eq_2(p),ei_1(p),eq_1(p))$;

$uq_2(p)=Fq(ei_2(p),eq_2(p),ei_1(p),eq_1(p))$;

$ui_3(p)=Fi(ei_3(p),eq_3(p),ei_2(p),eq_2(p))$;

$uq_3(p)=Fq(ei_3(p),eq_3(p),ei_2(p),eq_2(p))$;

$ui_4(p)=Fi(ei_4(p),eq_4(p),ei_3(p),eq_3(p))$;

$uq_4(p)=Fq(ei_4(p),eq_4(p),ei_3(p),eq_3(p))$;

$ui_5(p)=Fi(ei_5(p),eq_5(p),ei_4(p),eq_4(p))$;

$uq_5(p)=Fq(ei_5(p),eq_5(p),ei_4(p),eq_4(p))$;

$ui_6(p)=Fi(ei_6(p),eq_6(p),ei_5(p),eq_5(p))$;

$uq_6(p)=Fq(ei_6(p),eq_6(p),ei_5(p),eq_5(p))$;

$ui_7(p)=Fi(ei_7(p),eq_7(p),ei_6(p),eq_6(p))$;

$uq_7(p)=Fq(ei_7(p),eq_7(p),ei_6(p),eq_6(p))$;

$ui_8(p)=Fi(ei_8(p),eq_8(p),ei_7(p),eq_7(p))$; and $uq_8(p)=Fq(ei_8(p),eq_8(p),ei_7(p),eq_7(p-1))$.

Encoder

Figure 3:
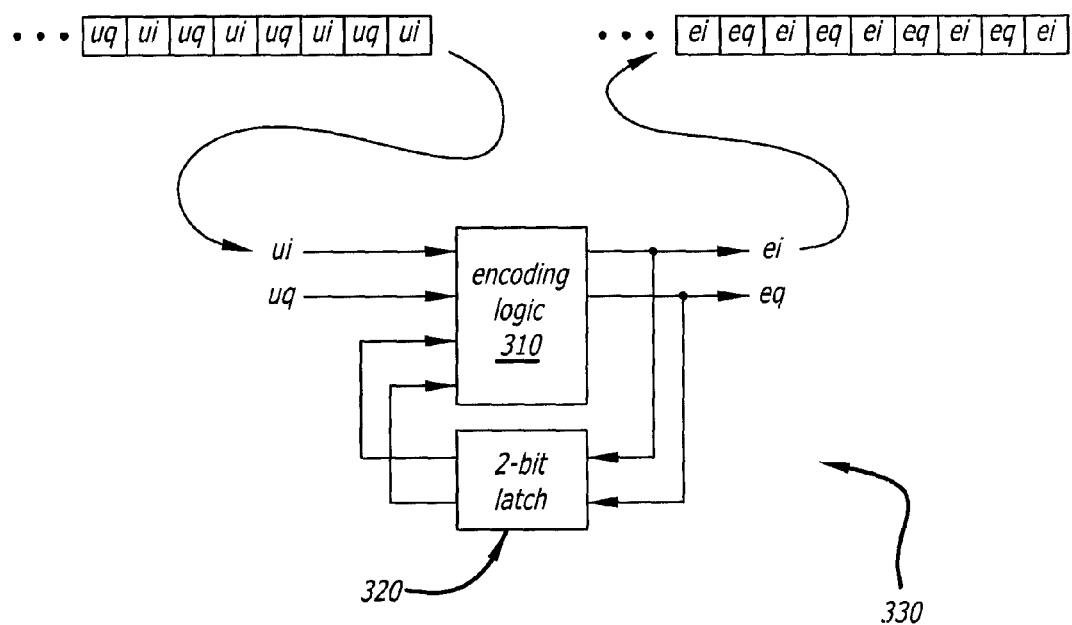
FIG. 3 is a simplified encoding block diagram in accordance with one embodiment of the present invention.

FIG. 3 is a simplified encoder block diagram. An encoder 330 includes an encoding logic unit 310 and a latch 320. The data inputted into the encoder 330 includes an in-phase input (ui) and a quadrature-phase input (uq). The data outputted from the encoder 330 includes an encoded in-phase output (ei) and an encoded quadrature-phase output (eq).

Figure 4:
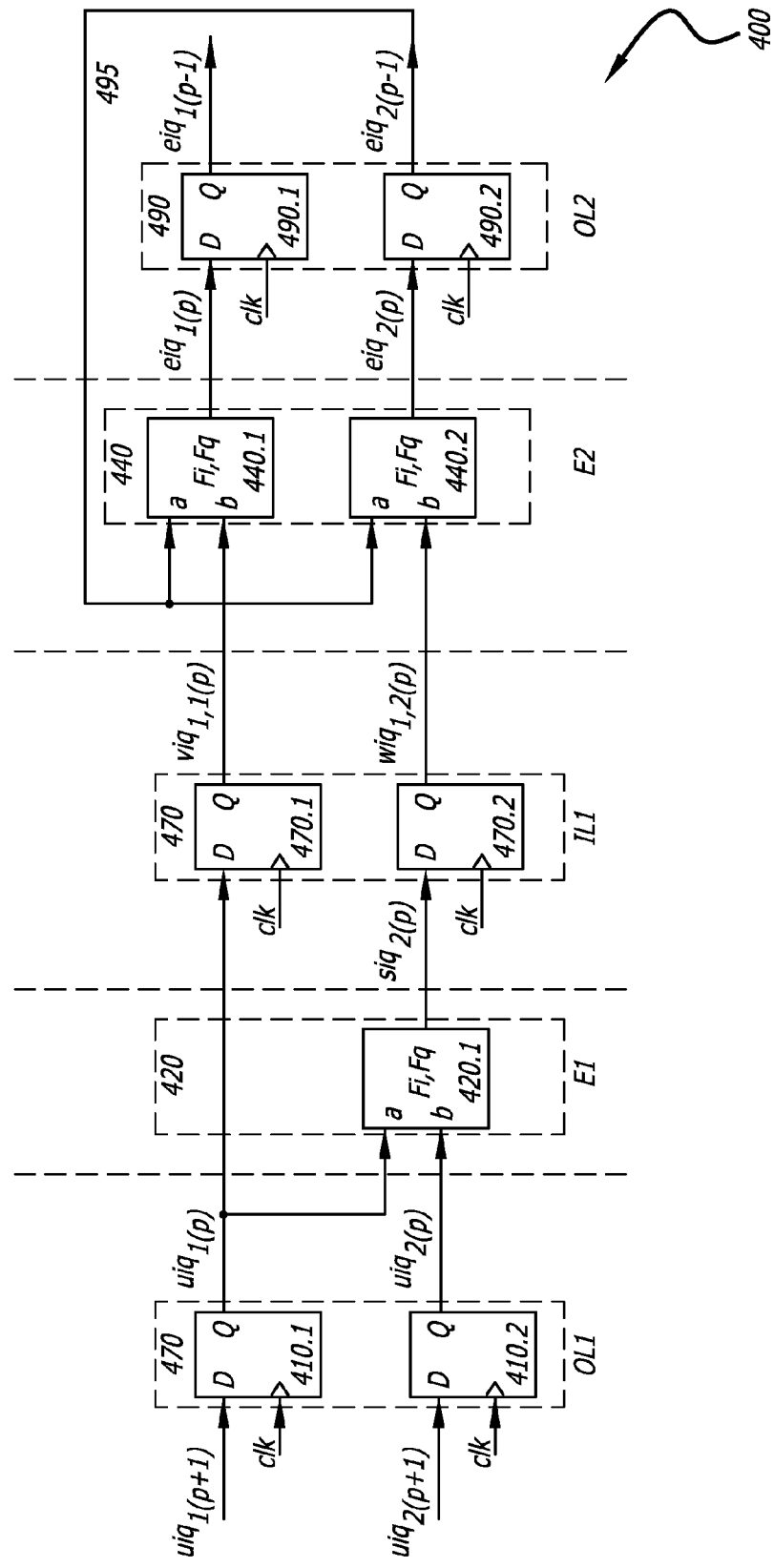
FIG. 4 is a block diagram of an encoder for two pairs of in-phase and quadrature-phase (i-q) bit streams in accordance with one embodiment of the present invention.

FIG. 4 is a simplified block diagram of a DQPSK encoder for 2 pairs of i-q bit streams in accordance with one embodiment of the present invention. An encoder 400 includes five stages: an input latch stage OL1, a first encoding stage E1, an intermediate latch stage IL1, a second encoding stage E2, and an output latch stage OL2. The second encoding stage E2 is the last encoding stage of the encoder 400. The encoder 400 includes at least one intermediate latch stage and multiple encoding stages.

The input latch stage OL1 includes an input latch circuitry 410, which includes two input latches 410.1 and 410.2. Each of the input latches 410.1 and 410.2 has two inputs and one output. Each of the input latches 410.1 and 410.2 receives a pair of i-q bit streams (e.g., $uiq_1(p+1)$ or $uiq_2(p+1)$) and a clock signal (e.g., clk) as inputs and provides a pair of i-q bit streams (e.g., $uiq_1(p)$ or $uiq_2(p)$) as an output.

The first encoding stage E1 includes a first encoding circuitry 420, which includes an encoding logic unit 420.1. The encoding logic unit 420.1 receives two inputs (e.g., $uiq_1(p)$ and $uiq_2(p)$) and produces one output $siq_2(p)$).

The intermediate latch stage IL1 includes an intermediate latch circuitry 470, which includes two intermediate latches 470.1 and 470.2. Each of the intermediate latches 470.1 and 470.2 receives a pair of i-q bit streams (e.g., $uiq_1(p)$ or $siq_2(p)$) and a clock signal (e.g., clk) as inputs and provides a pair of i-q bit streams (e.g., $viq_{1,1}(p)$ or $wiq_{1,2}(p)$) as outputs.

The first latch of the input latch stage OL1 is coupled to the first encoding stage E1 and the intermediate latch stage IL1 so that an output of the first latch (e.g., $uiq_1(p)$) is provided to the first encoding logic unit 420.1 of the first encoding stage E1 as well as the first intermediate latch 470.1 of the intermediate latch stage IL1.

The output latch stage OL2 includes an output latch circuitry 490, which includes two output latches 490.1 and 490.2. Each of the output latches 490.1 and 490.2 has two inputs and one output. Each of the output latches 490.1 and 490.2 receives a pair of i-q bit streams (e.g., $eiq_1(p)$ or $eiq_2(p)$) and a clock signal (e.g., clk) as inputs and provides a pair of i-q bit streams (e.g., $eiq_1(p-1)$ or $eiq_2(p-1)$) as an output.

The second encoding stage E2 includes a second encoding circuitry 440, which includes encoding logic units 440.1 and 440.2. Each of the encoding logic units 440.1 and 440.2 receives two inputs ((a) and (b) inputs) and produces one output.

The encoding logic unit 440.1 receives a first pair of i-q bit streams at the (a) input from the last output latch 490.02 (e.g., $eiq_2(p-1)$) and a second pair of i-q bit streams at the (b) input from the intermediate latch 470.1 (e.g., $viq_{1,1}(p)$) and provides one output (e.g., $eiq_1(p)$) to the output latch 490.1. The encoding logic unit 440.2 receives a first pair of i-q bit streams at the (a) input from the last output latch 490.02 (e.g., $eiq_2(p-1)$) and a second pair of i-q bit streams at the (b) input from the intermediate latch 470.2 (e.g., $wiq_{1,2}(p)$) and provides one output (e.g., $eiq_2(p)$) to the output latch 490.2.

A feedback 495 is provided between the output latch stage OL2 and the second encoding stage E2 (the last encoding stage). According to one embodiment, only the last output latch 490.02 of the output latch stage OL2 (not any of the other output latches) provides its output (encoded data) to each of the (a) inputs of the encoding logic units 440.1 and 440.2. The feedback 495 of the encoder 400 is provided only to the last encoding stage, and not to the encoding logic unit of the first encoding stage E1, the latches of the input latch stage OL1 or the latches of the intermediate latch stage IL1.

The notation "iq" represents in-phase and quadrature-phase. The notation "uiq" is for a pair of in-phase and quadrature-phase inputs (ui and uq), and thus includes two inputs. For simplicity, only one input arrow is shown for each input of the latch. The notation "eiq" is for in-phase and quadrature-phase outputs (ei and eq) and thus includes two outputs. For simplicity, only one output arrow is shown for each input and output of the latch. For example, each of $uiq_1(p+1)$, $uiq_2(p+1)$, $uiq_1(p)$, $uiq_2(p)$, $siq_2(p)$, $viq_{1,1}(p)$, $wiq_{1,2}(p)$, $eiq_1(p)$, $eiq_2(p)$, $eiq_1(p-1)$, and $eiq_2(p-1)$ includes a pair of in-phase and quadrature phase inputs or outputs. The above description regarding iq applies to FIGS. 4-7.

In FIG. 4, the first and second encoding stages E1 and E2 are interposed between the input latch stage OL1 and the output latch stage OL2. The intermediate latch stage IL1 is interposed between the input latch stage OL1 and the output latch stage OL2.

The first encoding stage E1 is interposed between the input latch stage OL1 and the intermediate latch stage IL1. The second encoding stage E2 (the last encoding stage) is adjacent to the output latch stage OL2 and interposed between the intermediate latch stage IL1 and the output latch stage OL2.

Still referring to FIG. 4, the input latch stage OL1 consists of M input latches, the intermediate latch stage IL1 consists of M intermediate latches, the last encoding stage E2 consists of M encoding logic units, and the output latch stage OL2 consists of M output latches. The encoder 400 is for M data streams (or M pairs of i-q bit streams). M is a positive whole number, and in this exemplary embodiment, M is 2.

In another embodiment, the encoder 400 can be utilized for other types of data. For example, if an encoder does not receive in-phase and quadrature-phase inputs and outputs, then each of $uiq_1(p+1)$, $uiq_2(p+1)$, $uiq_1(p)$, $uiq_2(p)$, $siq_2(p)$, $viq_{1,1}(p)$, $wiq_{1,2}(p)$, $eiq_1(p)$, $eiq_2(p)$, $eiq_1(p-1)$, and $eiq_2(p-1)$ may include one input or output rather than a pair of inputs or outputs.

Figure 5:
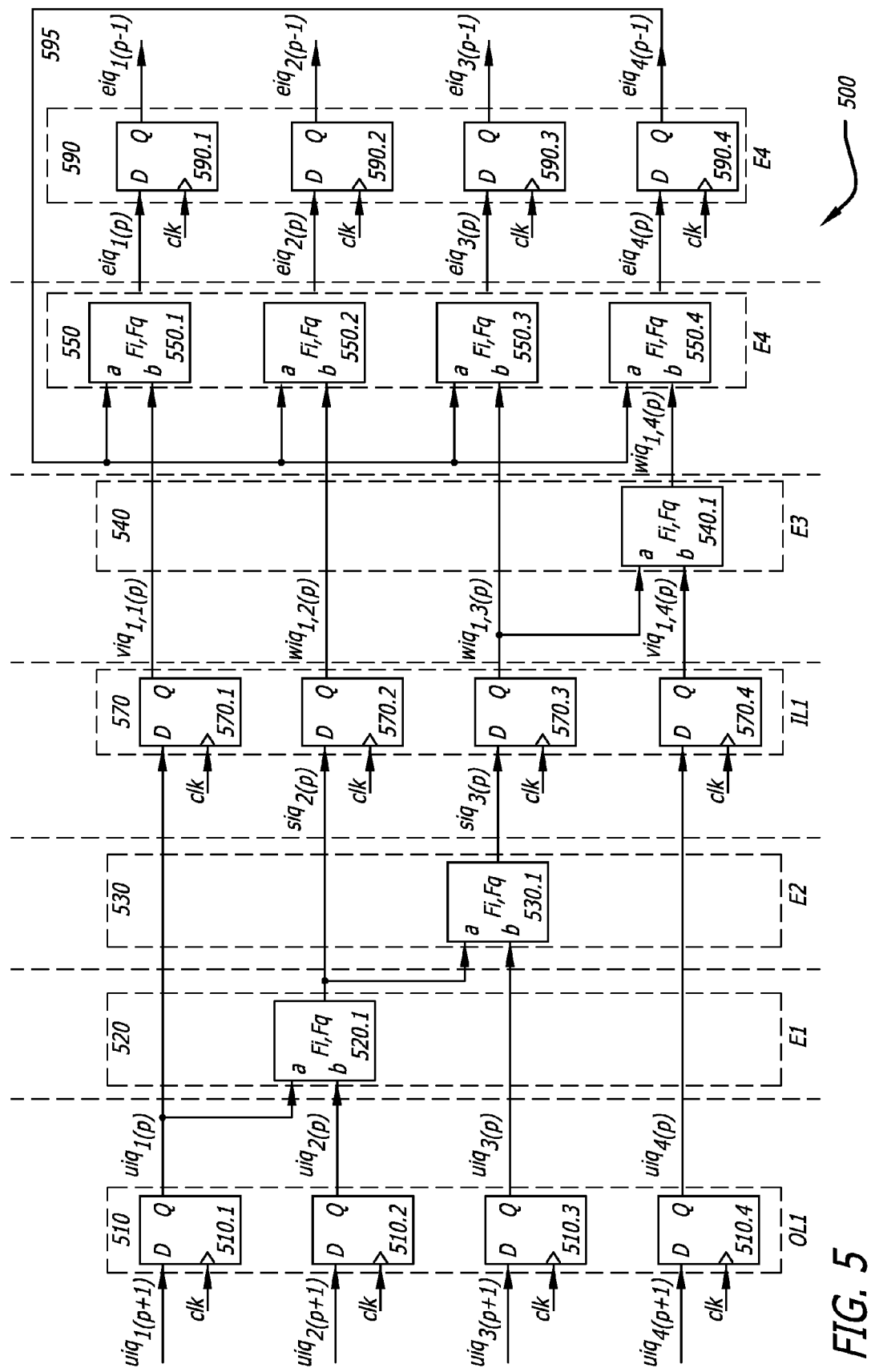
FIG. 5 is a block diagram of an encoder for four pairs of i-q bit streams in accordance with one embodiment of the present invention.

FIG. 5 is a block diagram of a DQPSK encoder for 4 pairs of i-q bit streams in accordance with one embodiment of the present invention. An encoder 500 includes seven stages: an input latch stage OL1, an output latch stage OL2, an intermediate latch stage IL1, a first encoding stage E1, a second encoding stage E2, a third encoding stage E3 and a fourth encoding stage E4 (the last encoding stage) with a feedback 595 from OL2 to E4.

OL1 includes an input latch circuitry 510, OL2 includes an output latch circuitry 590, and IL1 includes an intermediate latch circuitry 570. E1 includes a first encoding circuitry 520, E2 includes a second encoding circuitry 530, E3 includes a third encoding circuitry 540, and E4 includes a last encoding circuitry 550.

Each of the input latch stage OL1, the intermediate latch stage IL1 and the output latch stage OL2 includes M (in this case, 4) latches, each latch for a pair of i-q bit streams. The input latch stage OL1 includes 4 input latches 510.1, 510.2, 510.3 and 510.4, the intermediate latch stage IL1 includes 4 intermediate latches 570.1, 570.2, 570.3 and 570.4, and the output latch stage OL2 includes 4 output latches 590.1, 590.2, 590.3 and 590.4. Each of the latches and encoding logic circuitries shown in FIG. 5 have characteristics and functionalities similar to those in FIG. 4.

The encoder 500 includes at least one intermediate latch stage and multiple encoding stages. The number of encoding stages is equal to the number of pairs of i-q bit streams. If the number of the input latches in the input latch stage OL1 is M, then the number of encoding stages is also M. In this example, M is 4. Each of the encoding stages except for the last encoding stage (e.g., E1, E2 and E3) consists of only one encoding logic unit (e.g., 520.1 for E1, 530.1 for E2, and 540.1 for E3) in that encoding is processed in series.

The last encoding stage E4 includes 4 encoding logic units 550.1, 550.2, 550.3 and 550.4. It has the same number of encoding logic units as the number of the input latches of the input latch stage OL1 (or the number of the output latches of the output latch stage OL2 or the number of pairs of i-q bits streams).

The feedback 595 is provided between the output latch stage OL2 and the last encoding stage E4. The output (encoded data) of the last output latch 590.4 of the output latch stage OL2 is fed back to an input of each of the encoding logic units 550.1, 550.2, 550.3 and 550.4 of the last encoding stage E4.

The encoder 500 is an encoder for pipelining encoded data (or for pipelining data encoded serially). The encoder 500 utilizes the intermediate latch stage IL1 for pipelining and the encoding stages E1, E2 and E3 for serially encoding data. Each of E1, E2 and E3 encodes data serially by utilizing one encoding logic unit per stage (or utilizing encoding logic units serially) rather than utilizing multiple encoding logic units in parallel. The encoder 500 does not utilize a rotational look-ahead strategy.

Figure 6:
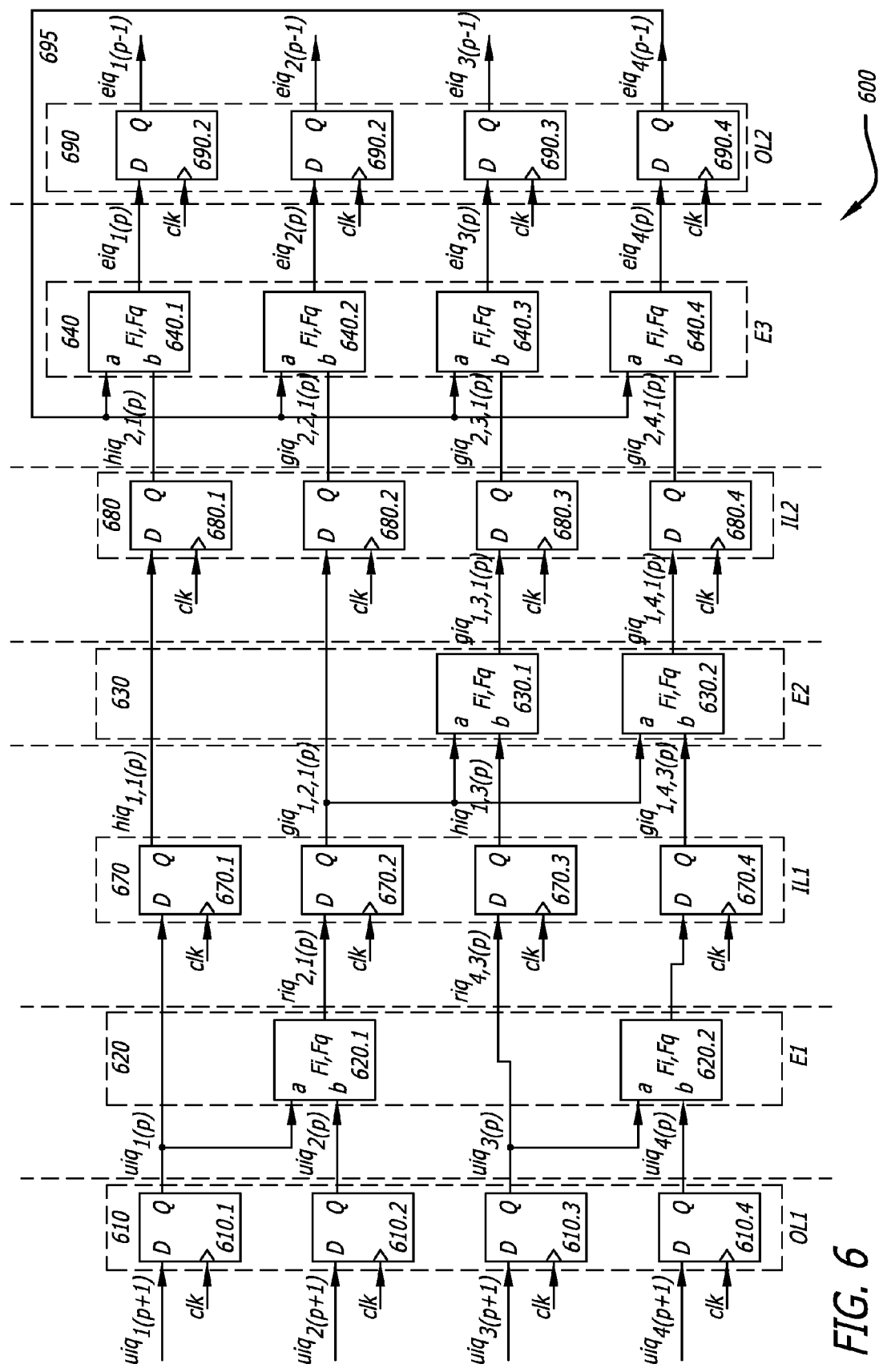
FIG. 6 is a block diagram of an encoder for four pairs of i-q bit streams in accordance with one embodiment of the present invention.

FIG. 6 is a block diagram of an encoder for 4 pairs of i-q bit streams in accordance with one embodiment of the present invention. An encoder 600 includes seven stages: an input latch stage OL1, an output latch stage OL2, two intermediate latch stages IL1 and IL2 and three encoding stages E1, E2 and E3, with a feedback 695 from OL2 to E3. E3 is the last encoding stage.

OL1 includes an input latch circuitry 610, OL2 includes an output latch circuitry 690, IL1 includes an intermediate latch circuitry 670, and IL2 includes an intermediate latch circuitry 680. E1 includes a first encoding circuitry 620 having two encoding logic units 620.1 and 620.2. E2 includes a second encoding circuitry 630 having two encoding logic units 630.1 and 630.2. E3 includes a third encoding circuitry 640 having four encoding logic units 640.1, 640.2, 640.3 and 640.4.

Each of the input latch stage OL1, the intermediate latch stage IL1 and the output latch stage OL2 includes M (in this case, 4) latches, where each latch is for a pair of i-q bit streams. The input latch stage OL1 includes 4 input latches 610.1, 610.2, 610.3 and 610.4, the intermediate latch stage IL1 includes 4 intermediate latches 670.1, 670.2, 670.3 and 670.4, and the output latch stage OL2 includes 4 output latches 690.1, 690.2, 690.3 and 690.4. Each of the latches and encoding logic units shown in FIG. 6 have characteristics and functionalities similar to those in FIG. 4.

The encoder 600 includes at least one intermediate latch stage and multiple encoding stages. The number of encoding stages is less than the number of pairs of i-q bit streams or less than the number of input latches (or the number of output latches or the number of latches in an intermediate latch stage). If the number of the input latches in the input latch stage OL1 is M, then the number of encoding stages is less than M. In this example, M is 4. Each of the encoding stages (e.g., E1 and E2) consists of multiple encoding logic units in that encoding is processed in parallel.

The encoder 600 utilizes pipelining with a rotational look-ahead scheme. One or more intermediate latches provide pipelining. Having more than one encoding logic unit in at least some of the encoding stages (not counting the last encoding stage) provides the rotational look-ahead scheme.

The number of encoding stages between latch stages can vary between one encoding stage to multiple encoding stages. Depending on the clock period or the computation time allowed between the latch stages, the number of encoding stages between the latch stages can vary. The shorter the clock period, the less the number of encoding stages.

Each latch stage (e.g., OL1, IL1, IL2 and OL2) provides one symbol period. In other words, each latch stage outputs one symbol period prior data (e.g., the data outputted by OL1 are prior to the corresponding data inputted to OL1 by one symbol period).

For example, for OL1, $uiq_1(p)$ is one symbol period prior to $uiq_1(p+1)$; $uiq_2(p)$ is one symbol period prior to $uiq_2(p+1)$; $uiq_3(p)$ is one symbol period prior to $uiq_3(p+1)$; and $uiq_1(p)$ is one symbol period prior to $uiq_1(p+1)$. For IL1, $hiq_{1,3}(p)$ is one symbol period prior to $uiq_1(p)$; $giq_{1,2,1}(p)$ is one symbol period prior to $riq_{2,1}(p)$; $hiq_{1,3}(p)$ is one symbol period prior to $uiq_3(p)$; and $giq_{1,4,3}(p)$ is one symbol period prior to $riq_{4,3}(p)$.

For IL2, $hiq_{2,1}(p)$ is one symbol period prior to $hiq_{1,1}(p)$; $giq_{2,2,1}(p)$ is one symbol period prior to $giq_{1,2,1}(p)$; $giq_{2,3,1}(p)$ is one symbol period prior to $giq_{1,3,1}(p)$; and $giq_{2,4,1}(p)$ is one symbol period prior to $giq_{1,4,1}(p)$. For OL2, $eiq_1(p-1)$ is one symbol period prior to $eiq_1(p)$; $eiq_2(p-1)$ is one symbol period prior to $eiq_2(p)$; $eiq_3(p-1)$ is one symbol period prior to $eiq_3(p)$; and $eiq_4(p-1)$ is one symbol period prior to $eiq_4(p)$.

Since the encoder 600 has four latch stages, it provides four symbol periods. In other words, the encoder 600 outputs four symbol periods prior data (e.g., the data outputted by OL2 are prior to the corresponding data inputted to OL1 by four symbol periods). Accordingly, the encoder 600 provides a four symbol period delay between its input and its output. The feedback 695 provides to the last encoding stage E3 data that are four symbol period delayed (or four symbol periods prior to the data inputted into the encoder 600).

Each of the encoder 400 in FIG. 4 and the encoder 500 in FIG. 5 provides three symbol periods or a three symbol period delay because each has three latch stages (e.g., OL1, IL1 and OL2). The feedback of each of the encoders 400 and 500 provides to its corresponding last encoding stage data that are three symbol period delayed.

According to certain embodiments of the present invention, an encoder provides a delay of multiple symbol periods (e.g., a delay of more than one symbol period, a delay of more than two symbol periods, a delay of more than three symbol periods, a delay of more than four symbol periods, etc.), and a feedback of an encoder provides to the last encoding stage data that are delayed by multiple symbol periods (e.g., delayed by more than one symbol period, delayed by more than two symbol periods, delayed by more than three symbol periods, delayed by more than four symbol periods, etc.). The amount of delay depends on the number of latches (e.g., OL1, OL2, IL1, IL2, etc.), and the amount of delay equals to H symbol periods, where H is the number of latch stages.

Referring back to FIG. 1, when the data rate on each of the 16 channels between the transmitter 130 and the framer 120 is 2.5 Gb/s, the data rate on each of the 128 channels between the demultiplexer 131a and the encoder 133 is 312.5 Mb/s (which is 2.5 divided by 8). In this case, the encoder 133 is an encoder for 128 bit streams (or 64 pairs of i-q bit streams). The clock rate of the encoder 133 in FIG. 1 is 312.5 MHz, and the symbol period is 3.2 ns (which is 1 divided by the clock rate). If the encoder 133 has 5 latch stages (including the input and output latch stages and the intermediate latch stages), then the encoder 133 provides 5 symbol periods and a total delay of 16 ns (which is 5 times the symbol period).

According to one embodiment, an encoder has an input latch stage, an output latch stage, one or more intermediate latch stages, and N encoding stages, where the input latch stage has M input latches, the output latch stage has M output latches, and M is equal to N. According to another embodiment, M is greater than N.

According to one embodiment, an encoder includes one or more intermediate latch stage, one or more encoding stages and a last encoding stage, where each of the one or more encoding stages includes one encoding logic unit. According to another embodiment, each of the one or more encoding stages includes multiple encoding logic units. According to yet another embodiment, at least some of the one or more encoding stages includes one encoding logic unit, and the rest of the one or more encoding stages includes multiple encoding logic units.

According to one aspect of the present invention, by pipelining encoded data or pipelining with a rotational look-ahead scheme, an encoder can receive a large number of bit streams in parallel (e.g., 128 data streams) and thus accelerate the encoding speed. Such encoder can also accommodate a high data rate.

According to one embodiment, the number of input latches is equal to the number of data streams or the number of pairs of data streams. According to one embodiment, the number of output latches is equal to the number of input latches, and the number of encoding logic units of the last encoding stage is equal to the number of input latches.

According to one embodiment of the present invention, an encoder includes at least one intermediate latch stage. According to one embodiment, an encoder includes a feedback only from the output latch stage and only to the last encoding stage. There is no feedback from any of the input latch stage, an intermediate latch stage or an encoding stage. There is no feedback to any of the input latch stage, the output latch stage, an intermediate latch stage, or an encoding stage that is not the last encoding stage. According to one embodiment, if an encoder has M number of latches in the output latch stage, then the feedback is originated from the M-th latch of the output latch stage, and the feedback is provided to each of the M number of the encoding logic units in the last encoding stage.

According to one embodiment, the number of encoding stages between two adjacent latch stages is one. According to another embodiment, the number of encoding stages between two adjacent latch stages is greater than one. According to another embodiment, the number of encoding stages between two adjacent latch stages is less than the number of latches in the input latch stage.

Decoder

FIG. 7 is a block diagram of a decoder for m pairs of i-q bit streams in accordance with one embodiment of the present invention. A decoder 700 includes three stages: an input latch stage OL1, an output latch stage OL2, and a decoding stage E1.

OL1 includes an input latch circuitry 710 having multiple input latches 710.1, 710.2, 710.3, 710.4, ... 710.$m-2$, 710.$m-1$, and 710.$m$. OL2 includes an output latch circuitry 790 having multiple output latches 790.1, 790.2, 790.3, 790.4, ... 790.$m-2$, 790.$m-1$, 790.$m$, and 790.$m+1$. E1 includes a decoding circuitry 720 having multiple decoding logic units 720.1, 720.2, 720.3, 720.4, ... 720.$m-2$, 720.$m-1$, and 720.$m$. In this example, the number of latches in the output latch circuitry 790 is one more than the number of latches in the input latch circuitry 710 or is one more than the number of decoding logic units in the decoding circuitry 720.

A feed 795 is provided between the output latch stage OL2 and the decoding stage E1. The output of the last output latch 790.$m+1$ of the output latch stage OL2 is fed back to the first decoding logic unit of the decoding stage E1 (e.g., an input of the decoding logic unit 720.1). The feed 795 provides to the first decoding logic unit 720.1 of the decoding stage E1 encoded data with a delay of at least two symbol periods in that the encoded data is (or are) at least two symbol periods prior to the corresponding one of the encoded input data of the input latch stage OL1. In this example, $eiq_m(p-1)$ is two symbol periods prior to $eiq_m(p+1)$.

Each latch stage (e.g., OL1 and OL2) provides one symbol period. In other words, each latch stage outputs one symbol period prior data (e.g., the data outputted by OL1 are prior to the corresponding data inputted to OL1 by one symbol period).

For example, for OL1, $eiq_1(p)$ is one symbol period prior to $eiq_1(p+1)$; $eiq_2(p)$ is one symbol period prior to $eiq_2(p+1)$; $eiq_3(p)$ is one symbol period prior to $eiq_3(p+1)$; $eiq_4(p)$ is one symbol period prior to $eiq_4(p+1)$; $eiq_{m-2}(p)$ is one symbol period prior to $eiq_{m-2}(p+1)$; $eiq_{m-1}(p)$ is one symbol period prior to $eiq_{m-1}(p+1)$; and $eiq_m(p)$ is one symbol period prior to $eiq_m(p+1)$.

For OL2, $uiq_1(p-1)$ is one symbol period prior to $uiq_1(p)$; $uiq_2(p-1)$ is one symbol period prior to $uiq_2(p)$; $uiq_3(p-1)$ is one symbol period prior to $uiq_3(p)$; $uiq_4(p-1)$ is one symbol period prior to $uiq_4(p)$; $uiq_{m-2}(p-1)$ is one symbol period prior to $uiq_{m-2}(p)$; $uiq_{m-1}(p-1)$ is one symbol period prior to $uiq_{m-1}(p)$; $uiq_m(p-1)$ is one symbol period prior to $uiq_m(p)$; and $eiq_m(p-1)$ is one symbol period prior to $eiq_m(p)$.

Since the decoder 700 has two latch stages, it provides two symbol periods. In other words, the decoder 700 outputs two symbol periods prior data (e.g., the data outputted by OL2 are prior to the corresponding data inputted to OL1 by two symbol periods). Accordingly, the decoder 700 provides a two symbol period delay between its input and its output. The feed 795 provides to the decoding stage E1 data that are two symbol period delayed (or two symbol periods prior to the data inputted into the decoder 700).

Operation

According to one aspect of the present invention, an encoding operation in a transmitter includes: latching a plurality of first input signals at an input latch circuitry stage; receiving a plurality of second input signals at a first encoding logic circuitry stage coupled to the input latch circuitry stage; encoding the plurality of second input signals at the first encoding logic circuitry stage; latching a plurality of third input signals at an intermediate latch circuitry stage coupled to the first encoding logic circuitry stage; receiving a plurality of fourth input signals at a second encoding logic circuitry stage coupled to the intermediate latch circuitry stage; encoding the plurality of fourth input signals at the second encoding logic circuitry stage; latching a plurality of fifth input signals at an output latch circuitry stage coupled to the second encoding logic circuitry stage; providing a plurality of output signals at the output latch circuitry stage; and feeding back a last one of the plurality of output signals to the second encoding logic circuitry stage.

According to one aspect of the present invention, a decoding operation in a receiver includes: latching a plurality of sixth input signals at an input latch circuitry stage of a receiver; receiving a plurality of second input signals at a first decoding logic circuitry stage of the receiver coupled to the input circuitry stage of the receiver; decoding the plurality of second input signals at the first decoding logic circuitry stage of the receiver; latching a plurality of seventh input signals at an output latch circuitry stage of the receiver coupled to the first decoding logic circuitry stage of the receiver; providing a plurality of output signals at the output latch circuitry stage of the receiver; and feeding to the first decoding logic circuitry stage a signal with a delay of at least two symbol periods in that the signal is at least two symbol periods prior to the corresponding one of the plurality of sixth inputs.

According to one aspect of the present invention, an operation of a communication system includes: receiving a plurality of signals from a framer; demultiplexing a plurality of signals; and multiplexing a plurality of signals. The operation further includes: receiving a plurality of signals from a framer; demultiplexing a plurality of signals at a demultiplexer coupled to the encoder; multiplexing a plurality of signals at a multiplexer coupled to the encoder; providing a plurality of signals to an optical transmitter; receiving a plurality of signals from an optical receiver; recovering a plurality of signals at a recovery unit of the receiver; multiplexing a plurality of signals at a multiplexer of the receiver; and providing a plurality of signals to the framer.

According to one embodiment, the present invention is applicable to differential quadrature phase shift key (DQPSK) encoding and decoding (including pi/4 DQPSK and other types of DQPSK).

According to yet another embodiment, the present invention is applicable to differential encoding and decoding. Referring back to FIG. 1, if the transceiver 110 is used for differential encoding, the transmitter 130 contains one output driver rather than two output drivers 135a and 135b, and the transmitter 130 is coupled to one amplifier rather than two amplifiers 140a and 140b. The mux 134 produces one output at 40 Gb/s rather than two outputs (i.e., i and q) at 20 Gb/s. For differential decoding, the receiver 170 includes one input receiver rather than two input receivers 175a and 175b. The optical receiver 150b produces one output rather than two outputs (i.e., i and q) to the input receiver. The input receiver produces one output to the CDR 176. The CDR 176 produces 128 parallel data.

According to another embodiment, the present invention is applicable to differential binary phase shift key (DBPSK) encoding and decoding. According to yet another embodiment, the present invention is applicable to on-off key encoding and decoding. According to yet another embodiment, the present invention is applicable encoding and decoding where encoding depends on a previous state or a previous set of data. According to yet another embodiment, the present invention is applicable to other types of encoding and decoding.

The numbers of bit streams or channels shown are exemplary, and the present invention is not limited to these numbers. The date rates such as 2.5 Gb/s, 20 Gb/s and 40 Gb/s are also exemplary, and the present invention is not limited to these data rates.

According to one embodiment, the transmitter and receiver of the present invention may be coupled to other types of transmission media (e.g., wireless, electrical carriers). According to one embodiment, a latch can be a register, a flip-flop circuit, or a circuit that stores information. A latch is not limited to these examples.

While the various circuits are grouped into particular stages (e.g., an input latch stage, an output latch stage, intermediate latch stages, encoding stages and a decoding stage) in accordance with one embodiment, the invention is not limited to these exemplary groupings. For example, in FIG. 5, one encoding stage may include the encoding logic units 520.1 and 530.1, and one encoding stage may include the encoding logic units 540.1, 550.1, 550.2, 550.3, and 550.4. The encoding stage E4 may be divided into multiple encoding stages (e.g., one including 550.1, and another including 550.2, 550.3, and 550.4). Similarly, in FIG. 6, some of the encoding logic units can be combined into one encoding stage, or some of the encoding logic units can be divided into multiple encoding stages. In FIG. 7, some of the decoding logic units can be divided into multiple decoding stages. Each of the latch stages in FIGS. 4-7 can be grouped differently (e.g., some of the latches can be divided into different latch stages). For example, the output latch 790.$m$+1 can be part of a different latch stage. All of these different embodiments are considered to be within the scope of the invention, and the claims of the invention cover these different embodiments.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A differential quadrature phase shift key (DQPSK) communication system for an optical communication system, the communication system comprising:
 a framer interface configured to receive a plurality of data;
 an encoder coupled to the framer interface, the encoder comprising:
  an input latch circuitry stage having a plurality of first inputs for receiving a plurality of first input signals and a plurality of first outputs for providing a plurality of first output signals, the plurality of first inputs including a plurality of in-phase and quadrature-phase inputs, the plurality of first outputs including a plurality of in-phase and quadrature-phase outputs;
  an output latch circuitry stage having a plurality of second inputs for receiving a plurality of second input signals and a plurality of second outputs for providing a plurality of second output signals, the plurality of second inputs including a plurality of in-phase and quadrature-phase inputs, the plurality of second outputs including a plurality of in-phase and quadrature-phase outputs;
  an intermediate latch circuitry stage interposed between the input latch circuitry stage and the output latch circuitry stage, the intermediate latch circuitry stage coupled to the input latch circuitry stage and the output latch circuitry stage, the intermediate latch circuitry stage having a plurality of third inputs for receiving a plurality of third input signals and a plurality of third outputs for providing a plurality of third output signals, the plurality of third inputs including a plurality of in-phase and quadrature-phase inputs, the plurality of third outputs including a plurality of in-phase and quadrature-phase outputs;

a plurality of encoding logic circuitry stages interposed between the input latch circuitry stage and the output latch circuitry stage, a last one of the plurality of encoding logic circuitry stages placed adjacent to the output latch circuitry stage and coupled to the output latch circuitry stage, the last one of the plurality of encoding logic circuitry stages having a plurality of fourth inputs and a plurality of fourth outputs, the plurality of fourth inputs including a plurality of in-phase and quadrature-phase inputs, the plurality of fourth outputs including a plurality of in-phase and quadrature-phase outputs; and a feedback between the output latch circuitry stage and the last one of the plurality of encoding logic circuitry stages, the feedback for providing a last one of the plurality of second output signals from a last one of the plurality of second outputs, the last one of the plurality of second outputs corresponding to a last one of the plurality of second inputs, the last one of the plurality of second inputs for receiving a last one of the plurality of second input signals, one of the plurality of fourth inputs for receiving the last one of the plurality of second output signals via the feedback, the one of the plurality of fourth inputs corresponding to one of the plurality of fourth outputs, the one of the plurality of fourth outputs for providing a fourth output signal that is the last one of the plurality of second input signals;

a multiplexer coupled to the encoder; and a clock multiplier unit (CMU) coupled to the encoder and the multiplexer.

2. The communication system according to claim 1 further comprising:

output drivers coupled to the multiplexer;

input receivers;

a clock data recovery unit (CDR) coupled to the input receivers;

a decoder coupled to the clock data recovery unit, the decoder including:

a second input latch circuitry stage having a plurality of fifth inputs for receiving a plurality of fifth input signals and a plurality of fifth outputs for providing a plurality of fifth output signals;

a second output latch circuitry stage having a plurality of sixth inputs for receiving a plurality of sixth input signals and a plurality of sixth outputs for providing a plurality of sixth output signals;

a decoding logic circuitry stage interposed between the second input latch circuitry stage and the second output latch circuitry stage, the decoding logic circuitry stage having a plurality of seventh inputs for receiving a plurality of seventh input signals and a plurality of seventh outputs for providing a plurality of seventh output signals; and a feed coupled to the decoding logic circuitry stage, the feed for providing the decoding logic circuitry stage a signal with a delay of at least two symbol periods in that the signal is at least two symbol periods prior to the corresponding one of the plurality of fifth inputs; and a second framer interface coupled to the decoder.

3. The communication system according to claim 1 further comprising a framer coupled to the framer interface.

4. The communication system according to claim 1, wherein the clock multiplier unit includes a voltage controlled oscillator, wherein the clock multiplier unit is configured to receive a reference signal and to provide clock signals to the framer interface, the encoder, and the multiplexer.

5. The communication system according to claim 1, wherein the framer interface includes a demultiplexer.

6. The communication system according to claim 2, wherein the output drivers are configured to be coupled to an optical transmitter, and the input receivers are configured to be coupled to an optical receiver.

7. The communication system according to claim 1, wherein the feedback is configured to provide an encoded signal with a delay of more than two symbol periods.

8. A communication system comprising:

an encoder including:

an input latch circuitry stage having a plurality of first inputs for receiving a plurality of first input signals and a plurality of first outputs for providing a plurality of first output signals;

an output latch circuitry stage having a plurality of second inputs for receiving a plurality of second input signals and a plurality of second outputs for providing a plurality of second output signals;

an intermediate latch circuitry stage interposed between the input latch circuitry stage and the output latch circuitry stage, the intermediate latch circuitry stage coupled to the input latch circuitry stage and the output latch circuitry stage, the intermediate latch circuitry stage having a plurality of third inputs for receiving a plurality of third input signals and a plurality of third outputs for providing a plurality of third output signals;

a plurality of encoding logic circuitry stages interposed between the input latch circuitry stage and the output latch circuitry stage, a last one of the plurality of encoding logic circuitry stages placed adjacent to the output latch circuitry stage and coupled to the output latch circuitry stage, the last one of the plurality of encoding logic circuitry stages having a plurality of fourth inputs and a plurality of fourth outputs; and a feedback between the output latch circuitry stage and the last one of the plurality of encoding logic circuitry stages, the feedback for providing a last one of the plurality of second output signals from a last one of the plurality of second outputs, the last one of the plurality of second outputs corresponding to a last one of the plurality of second inputs, the last one of the plurality of second inputs for receiving a last one of the plurality of second input signals, one of the plurality of fourth inputs for receiving the last one of the plurality of second output signals via the feedback, the one of the plurality of fourth inputs corresponding to one of the plurality of fourth outputs, the one of the plurality of fourth outputs for providing a fourth output signal that is the last one of the plurality of second input signals.

9. The communication system according to claim 8 further comprising:
   a decoder including:
      a second input latch circuitry stage having a plurality of fifth inputs for receiving a plurality of fifth input signals and a plurality of fifth outputs for providing a plurality of fifth output signals;
      a second output latch circuitry stage having a plurality of sixth inputs for receiving a plurality of sixth input signals and a plurality of sixth outputs for providing a plurality of sixth output signals;
      a decoding logic circuitry stage interposed between the second input latch circuitry stage and the second output latch circuitry stage, the decoding logic circuitry stage having a plurality of seventh inputs for receiving a plurality of seventh input signals and a plurality of seventh outputs for providing a plurality of seventh output signals; and
      a feed coupled to the decoding logic circuitry stage, the feed for providing the decoding logic circuitry stage a signal with a delay of at least two symbol periods in that the signal is at least two symbol periods prior to the corresponding one of the plurality of fifth inputs.

10. The communication system according to claim 9, wherein the second input latch circuitry stage includes M input latches, the second output latch circuitry stage includes M+1 output latches, and the decoding logic circuitry stage includes M decoding logic units,
   wherein each of the M input latches corresponds to one of the M decoding logic units, and each of the M decoding logic units corresponds to at least one of the M+1 output latches,
   wherein an output of the M+1$^{th}$ output latch of the M+1 output latches is fed to an input of the first decoding logic unit of the M decoding logic units,
   wherein M is a positive whole number.

11. The communication system according to claim 9 further comprising:
   a framer interface coupled to the encoder;
   a multiplexer coupled to the encoder;
   an output driver coupled to the multiplexer;
   a clock multiplier unit (CMU) coupled to the encoder and the multiplexer;
   an input receiver;
   a clock data recovery unit (CDR) coupled to the input receiver and the decoder; and
   a second framer interface coupled to the decoder.

12. The communication system according to claim 11 further comprising:
   a framer coupled to the framer interface and the second framer interface;
   an optical transmitter coupled to the output drivers; and
   an optical receiver coupled to the input receivers.

13. The communication system according to claim 8 further comprising:
   a framer interface coupled to the encoder;
   a multiplexer coupled to the encoder;
   an output driver coupled to the multiplexer; and
   a clock multiplier unit (CMU) coupled to the encoder and the multiplexer.

14. The communication system according to claim 8, wherein the plurality of encoding logic circuitry stages includes a first encoding logic circuitry stage interposed between the input latch circuitry stage and the intermediate latch circuitry stage, the first encoding logic circuitry stage including a first encoding logic unit, the first encoding logic unit including a plurality of inputs and an output,
   wherein one of the plurality of first outputs of the input latch circuitry stage is coupled to a first one of the plurality of inputs of the first encoding logic unit and to one of the plurality of third inputs of the intermediate latch circuitry stage,
   wherein a second one of the plurality of first outputs of the input latch circuitry stage is coupled to a second one of the plurality of inputs of the first encoding logic unit.

15. The communication system according to claim 14, wherein the first encoding logic circuitry stage includes a second encoding logic unit, the second encoding logic unit including a plurality of inputs and an output,
   wherein a third one of the plurality of first outputs of the input latch circuitry stage is coupled to a first one of the plurality of inputs of the second encoding logic unit,
   wherein a fourth one of the plurality of first outputs of the input latch circuitry stage is coupled to a second one of the plurality of inputs of the second encoding logic unit.

16. The communication system according to claim 8, wherein the input latch circuitry stage consists of M input latches, and the plurality of encoding logic circuitry stages consists of N encoding logic circuitry stages,
   wherein M is greater than N,
   wherein M is a positive whole number, and N is another positive whole number.

17. The communication system according to claim 8, wherein the input latch circuitry stage consists of M input latches, the output latch circuitry stage consists of M output latches, and the last one of the plurality of encoding logic circuitry stages consists of M encoding logic units,
   wherein M is a positive whole number.

18. The communication system according to claim 8, wherein each one of the plurality of encoding logic circuitry stages, excluding the last one of the plurality of encoding logic circuitry stages, consists of one encoding logic unit or includes one or more encoding logic units in series.

19. The communication system according to claim 8, wherein each one of the plurality of encoding logic circuitry stages includes more than one encoding logic unit in parallel.

20. The communication system according to claim 8, wherein the output latch circuitry stage includes M output latches, the last one of the plurality of encoding logic circuitry stages includes M encoding logic units, and each of the M encoding logic units includes a plurality of inputs,
   wherein an output of the M$^{th}$ output latch of the M output latches is coupled to at least one input of the plurality of inputs of each of the M encoding logic units,
   wherein the output of the M$^{th}$ output latch includes one or more outputs, and the at least one input includes one or more inputs,
   wherein M is a positive whole number.

21. The communication system according to claim 8 further comprising:
   an additional intermediate latch circuitry stage interposed between the input latch circuitry stage and the output latch circuitry stage, the additional intermediate latch circuitry stage coupled to the input latch circuitry stage and the output latch circuitry stage.

22. The communication system according to claim 8, wherein the input latch circuitry stage includes M input latches, and each of the M input latches includes an input for in-phase (i) data and an input for quadrature-phase (q) data,
   wherein the output latch circuitry stage includes M output latches, and each of the M output latches includes an output for in-phase (i) data and an output for quadrature-phase (q) data,
   wherein M is a positive whole number.

23. A method for processing communication signals, the method comprising steps of:
  latching a plurality of first input signals at an input latch circuitry stage;
  receiving a plurality of second input signals at a first encoding logic circuitry stage coupled to the input latch circuitry stage;
  encoding the plurality of second input signals at the first encoding logic circuitry stage;
  latching a plurality of third input signals at an intermediate latch circuitry stage coupled to the first encoding logic circuitry stage;
  receiving a plurality of fourth input signals at a second encoding logic circuitry stage coupled to the intermediate latch circuitry stage;
  encoding the plurality of fourth input signals at the second encoding logic circuitry stage;
  latching a plurality of fifth input signals at an output latch circuitry stage coupled to the second encoding logic circuitry stage;
  providing a plurality of output signals at the output latch circuitry stage; and
  feeding back a last one of the plurality of output signals to the second encoding logic circuitry stage,
  wherein the input latch circuitry stage comprises a plurality of first inputs for receiving the plurality of first input signals and a plurality of first outputs for providing a plurality of first output signals,
  wherein the output latch circuitry stage comprises a plurality of second inputs for receiving the plurality of fifth input signals and a plurality of second outputs for providing a plurality of second output signals,
  wherein the intermediate latch circuitry stage is interposed between the input latch circuitry stage and the output latch circuitry stage, and the intermediate latch circuitry stage comprises a plurality of third inputs for receiving the plurality of third input signals and a plurality of third outputs for providing a plurality of third output signals,
  wherein a plurality of encoding logic circuitry stages are interposed between the input latch circuitry stage and the output latch circuitry stage, the plurality of encoding logic circuitry stages comprise the first encoding logic circuitry stage and the second encoding logic circuitry stage, a last one of the plurality of encoding logic circuitry stages is placed adjacent to the output latch circuitry stage and coupled to the output latch circuitry stage, and the last one of the plurality of encoding logic circuitry stages comprises a plurality of fourth inputs and a plurality of fourth outputs,
  wherein the last one of the plurality of output signals is a last one of the plurality of second output signals provided by a last one of the plurality of second outputs, the last one of the plurality of second outputs corresponding to a last one of the plurality of second inputs, the last one of the plurality of second inputs for receiving a last one of the plurality of fifth input signals, one of the plurality of fourth inputs for receiving the last one of the plurality of second output signals, the one of the plurality of fourth inputs corresponding to one of the plurality of fourth outputs, the one of the plurality of fourth outputs for providing the last one of the plurality of fifth input signals.

24. The method according to claim 23, wherein the input latch circuitry stage, the first encoding logic circuitry stage, the intermediate latch circuitry stage, the second encoding logic circuitry stage and the output latch circuitry stage are included in an encoder of a transmitter, wherein the method further comprises steps of:
  latching a plurality of sixth input signals at an input latch circuitry stage of a receiver;
  receiving a plurality of second input signals at a first decoding logic circuitry stage of the receiver coupled to the input circuitry stage of the receiver;
  decoding the plurality of second input signals at the first decoding logic circuitry stage of the receiver;
  latching a plurality of seventh input signals at an output latch circuitry stage of the receiver coupled to the first decoding logic circuitry stage of the receiver;
  providing a plurality of output signals at the output latch circuitry stage of the receiver; and
  feeding to the first decoding logic circuitry stage a signal with a delay of at least two symbol periods in that the signal is at least two symbol periods prior to the corresponding one of the plurality of sixth inputs.

25. The method according to claim 24, wherein the signal is an encoded signal.

26. The method according to claim 23, further comprising steps of:
  receiving a plurality of signals from a framer;
  demultiplexing a plurality of signals; and
  multiplexing a plurality of signals.

27. The method according to claim 24, further comprising steps of:
  receiving a plurality of first signals from a framer;
  demultiplexing the plurality of first signals at a demultiplexer coupled to the encoder;
  multiplexing the plurality of first signals at a multiplexer coupled to the encoder;
  providing the plurality of first signals to an optical transmitter;
  receiving a plurality of second signals from an optical receiver;
  recovering the plurality of second signals at a recovery unit of the receiver;
  multiplexing the plurality of second signals at a multiplexer of the receiver; and
  providing the plurality of second signals to the framer.

28. The method according to claim 23, wherein the last one of the plurality of output signals includes an in-phase signal and a quadrature-phase signal.

29. The method according to claim 23, wherein at least one of the plurality of second input signals is one of the plurality of third input signals.

30. The method according to claim 23, wherein the second encoding logic circuitry stage includes a plurality of encoding logic units, wherein the step of feeding back a last one of the plurality of output signals to the second encoding logic circuitry stage includes feeding back the last one of the plurality of output signals to each one of the plurality of encoding logic units.

31. The method according to claim 23, wherein the step of feeding back includes a step of feeding back the last one of the plurality of output signals to the second encoding logic circuitry stage with a delay of more than two symbol periods in that the last one of the plurality of output signals is more than two symbol periods prior to the corresponding one of the plurality of first input signals.

32. The method according to claim 23, wherein the step of encoding the plurality of fourth input signals is a function of encoding a previous set of data.

33. The method according to claim 23, wherein a computational time of all of the steps recited in claim 23 is a logarithmic function of a total number of the plurality of first input signals.

* * * * *